United States Patent [19]

Hillman, Jr. et al.

[11] 3,821,478

[45] June 28, 1974

[54] PULSE CODE MODULATED TIME DIVISION MULTIPLEXED DATA TRANSMISSION SYSTEM

[75] Inventors: Alfred Kimball Hillman, Jr., Suncook; Harold Frederick Wochholz, Durham, both of N.H.; Dixon Brown Penick, Andover, Mass.

[73] Assignee: Northeast Electronics Corporation, Concord, N.H.

[22] Filed: Sept. 20, 1972

[21] Appl. No.: 290,765

[52] U.S. Cl. .......................................... 179/15 AF
[51] Int. Cl. .......................................... H04j 3/06
[58] Field of Search ......... 179/15 A, 15 AF, 15 AP; 325/38; 178/69.5 R

[56] References Cited

UNITED STATES PATENTS 3,663,760 5/1972 De Witt ......................... 179/15 AF

*Primary Examiner*—Ralph D. Blakeslee
*Attorney, Agent, or Firm*—Cooper, Dunham, Clark, Griffin & Moran

[57] ABSTRACT

A system for transmitting a binary data stream that has a given average rate over a multiplex channel that has a higher long term rate by using stuffed bits to bring up the density of the lower average rate bit stream so that it can be transmitted at the higher rate. The lower average rate bit stream is arranged by byte blocks, with each byte block having: its own block framing bit, an optional bit position in which a stuffed bit or a data bit may be placed as required, and a plurality of control bits which inform the receiving end if the block contains a stuffed bit or a data bit in the optional bit position. In one example, each block contains six eight-bit bytes. Bit 1 of each byte is used for the channel signaling in the T1 Carrier System. Bit positions 2 through 7 of each byte are taken up by data bits from the lower rate bit stream. Bit position 8 of the sixth byte in the block is a dedicated bit that is always occupied by a data bit. Bit position 8 of the fifth byte in the block is an optional bit position which may be either a stuffed bit or a data bit, and the second, third and fourth bytes contain in bit position 8 control bits which inform the receiving end if the optional bit position of that block is occupied by a data bit or by a stuffed bit.

24 Claims, 32 Drawing Figures

CIRCUIT DIAGRAM COMMON EQUIPMENT

BIPOLAR TO UNIPOLAR DATA RECOVERY CIRCUIT

FRAME PULSE GENERATOR CCT.

FRAMING DETECTOR CCT.

50 Kb/S TO 56Kb/S SYNCHRONIZING FORMAT

56 KHz CLOCK GEN. CCT.

BLOCK DIAGRAM - TRANSMITTER

OUTPUT INTERFACE CCT.

Fig. 15b. TRANSMITTER CCT. DIAGRAM
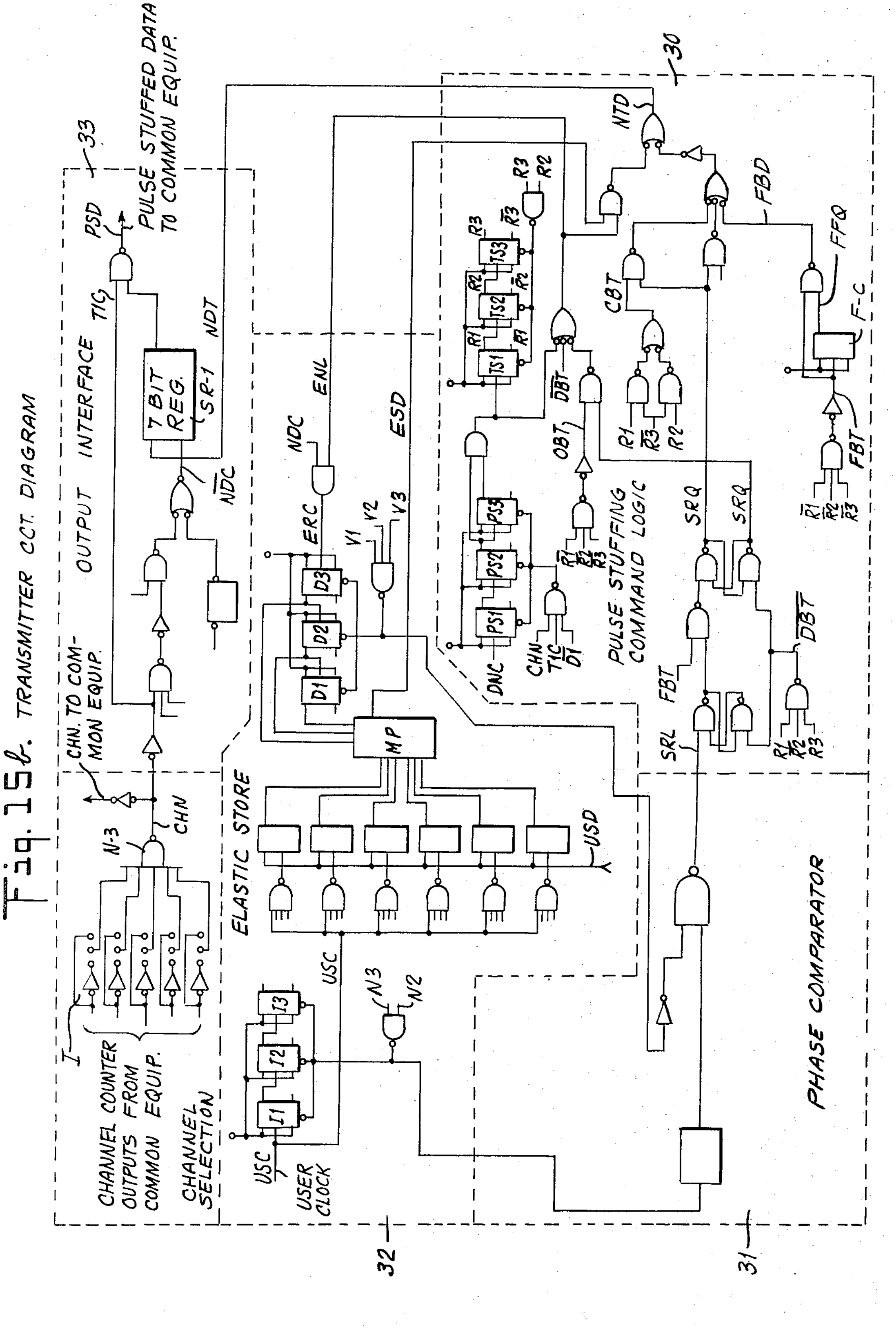

Fig. 16. PULSE STUFFING CCT.
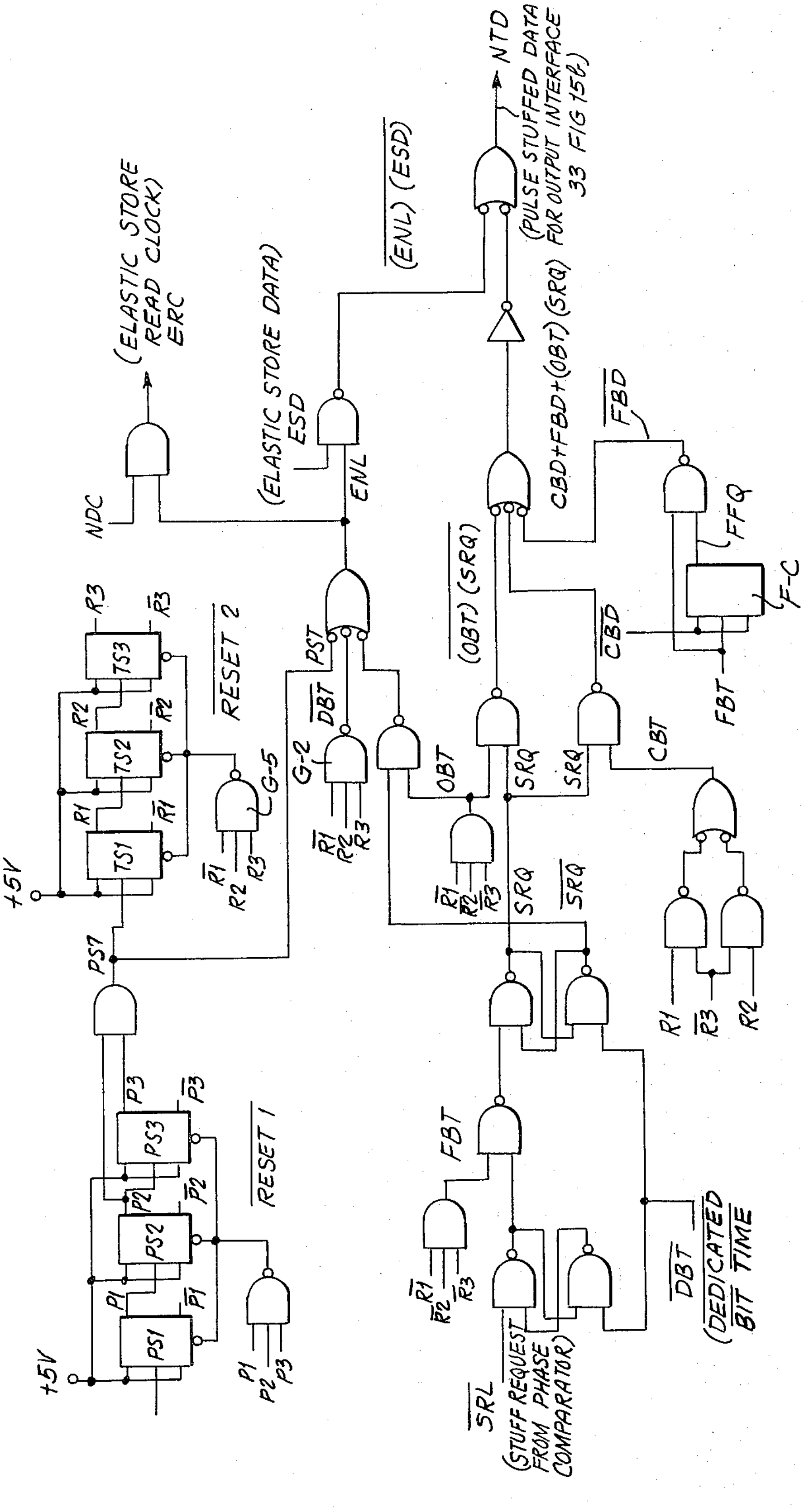

RECEIVER - BLOCK DIAGRAM

INPUT INTERFACE

CHANNEL FRAMING DETECTOR CCT.

CONTROL BIT MAJORITY DET CCT

PULSE CODE MODULATED TIME DIVISION MULTIPLEXED DATA TRANSMISSION SYSTEM

This invention pertains to digital data transmission systems adapted for data transmission over pulse code modulated (PCM), time division multiplexed communication systems, and provides improved methods and apparatus therefor.

The invention is particularly applicable to the transmission of data over the Bell System's PCM, T1 Carrier System as described in the Bell System Technical Journal (B.S.T.J.) for January 1962, pp. 1–24, and for September 1965, pp. 1,405–1,451.

An object of the invention is to provide methods and means for transmitting a data stream over the T1 carrier system by displacement of only one voice channel for each data stream.

A further object is to provide self-contained, plug-in, transmitter, receiver and common equipment modules which may be inserted into a framework/power supply housing suitable for 19 inch or 23 inch rack mounting.

A novel and unique feature of the invention resides in the fact that the data transmission and receiving modules thereof are coupled through common equipment modules thereof, directly to the 1.544 MHz carrier transmission facility of the T1 system at opposite ends thereof, respectively, and thus completely by-pass the D1 bank equipment. The invention thus by-passes the D1 bank analogue, compressing, encoding, multiplexing and unipolar-to-bipolar functions at the transmitting end, and the bipolar-to-unipolar, demultiplexing, decoding and expanding functions at the receiving end of the T1 transmission facility, and the consequent transmission distortions introduced by these functions when they are not perfectly adjusted.

Data transmitting and data receiving devices may operate in accordance with this invention at data rates normally acceptable for transmission over voice transmission paths. Such rates typically, may comprise 1.2, 2.4, 4.8, or 9.6 kb/s or other intermediate rates. One variation of the invention accepts data signals at any such rate in a transmitter module for transmission as described below to a receiver module for restoration thereat to its original form.

Other data transmitting and data receiving devices of the invention may operate at higher data rates requiring wideband transmission facilities. Such rates, typically, may be 40.8, 50, 56, or 64 kb/s or similar rates. Another variation of this invention accepts data signals at any one of these higher rates in a transmitter module for transmission as described below to a receiver module for restoration to its original form. In certain cases it will be necessary to provide a precise synchronizing clock signal from the transmitter module to the data transmitting device and from the receiver module to the data receiving device, the means for production of such synchronizing clock sources being a part of this invention.

In recent years the amount of data sent in digital form has increased rapidly. The need for efficient high speed transmission of such data has become apparent. Since the telephone network is so widespread and easily accessible, it has become a likely candidate for the transmission medium. Most telephone systems can provide an analog channel that has a bandwidth of approximately 48 kHz and with proper shaping a pulse train at 50 kb/s can be transmitted. In this way, the telephone industry has placed an upper boundary on the data rate that may be used. Many companies and much of the military have designed installations that operate at 50 kb/s to allow transmission over normal telephone lines. In many areas, some part of this transmission path will be over the T1 carrier system, as described in the above cited B.S.T.J. publications.

A problem arises when it is necessary to transmit 50 kb/s data over the T1 system because the voice information bit rate of the T1 system is 56 kb/s and hence is not a harmonic of 50 kb/s and because the 50 kb/s input is not synchronized with the system.

The T1 carrier system, as described in the above publications, is made up of 24 channels in a time division multiplexed and pulse code modulated (PCM) format. Each channel is made up of 8-bits, seven information bits and one bit for supervisory control. A frame consists of 24 channels totaling 192 bits. It is very important for the receiving end of the T1 system to know where it is relative to the start of a frame. For this reason a bit is inserted at the beginning of each frame and is called the framing bit. This bit alternates between a 0 and a 1 to allow the receiver to lock onto this pattern which would not be present anywhere else in the bit stream for a T1 voice signal.

Thus each frame of the T1 system is composed of 193 bits, (168 information bits, 24 supervisory bits, and one framing bit). Since a frame is repeated at the sampling rate of 8,000 samples/sec., the bit rate for transmission is 193 = 8.00 kHz = 1.544 mHz. Since each channel is made up of eight bits and is repeated 8,000 times a second, the maximum channel capacity is 64 kb/s with each bit corresponding to an 8 kb/s capacity. Also since one bit is reserved for signaling functions, the maximum channel capacity is reduced to 56 kb/s for data. It is obvious that one cannot put 50 kb/s data directly onto such a channel, since the channel bit rate is not synchronous with the 50 kb/s input rate.

Facilities have been devised for handling 50 kb/s data over the T1 system, one of which, designated T1WB–3, is described in the B.S.T.J. for October 1965. The T1WB–3 equipment will provide data service at 50 kb/s over the T1 line and will reproduce the input frequency at the output with only a small amount of high frequency phase jitter. The major disadvantage of the T1WB–3 facility is that it requires three channels of the T1 system to transmit this data. This is more than three times the actual data capacity needed since one channel of the T1 system has a capacity of 56 kb/s. Since this is inefficient when the capacity needed is compared to the capacity used, it has become apparent that a better method of transmission over T1 carrier facilities should be devised.

The present invention provides in one of its objectives, improved equipment for such applications which permits transmission of 50 kb/s or 40.8 kb/s data over a T1 system through the displacement of only one T1 channel.

The invention also provides in another of its objectives for the transmission of multiples of 50 kb/s data over a T1 system through displacement of two or more T1 depending upon whether the bit rate is two or more multiples of the 50 kb/s rate.

The invention is best described in its various aspects by immediate reference to the accompanying drawings wherein:

FIG. 1 is a block diagram showing schematically the application of the data transmission system of the present invention as applied to the T1 carrier system; while

Figure 2:
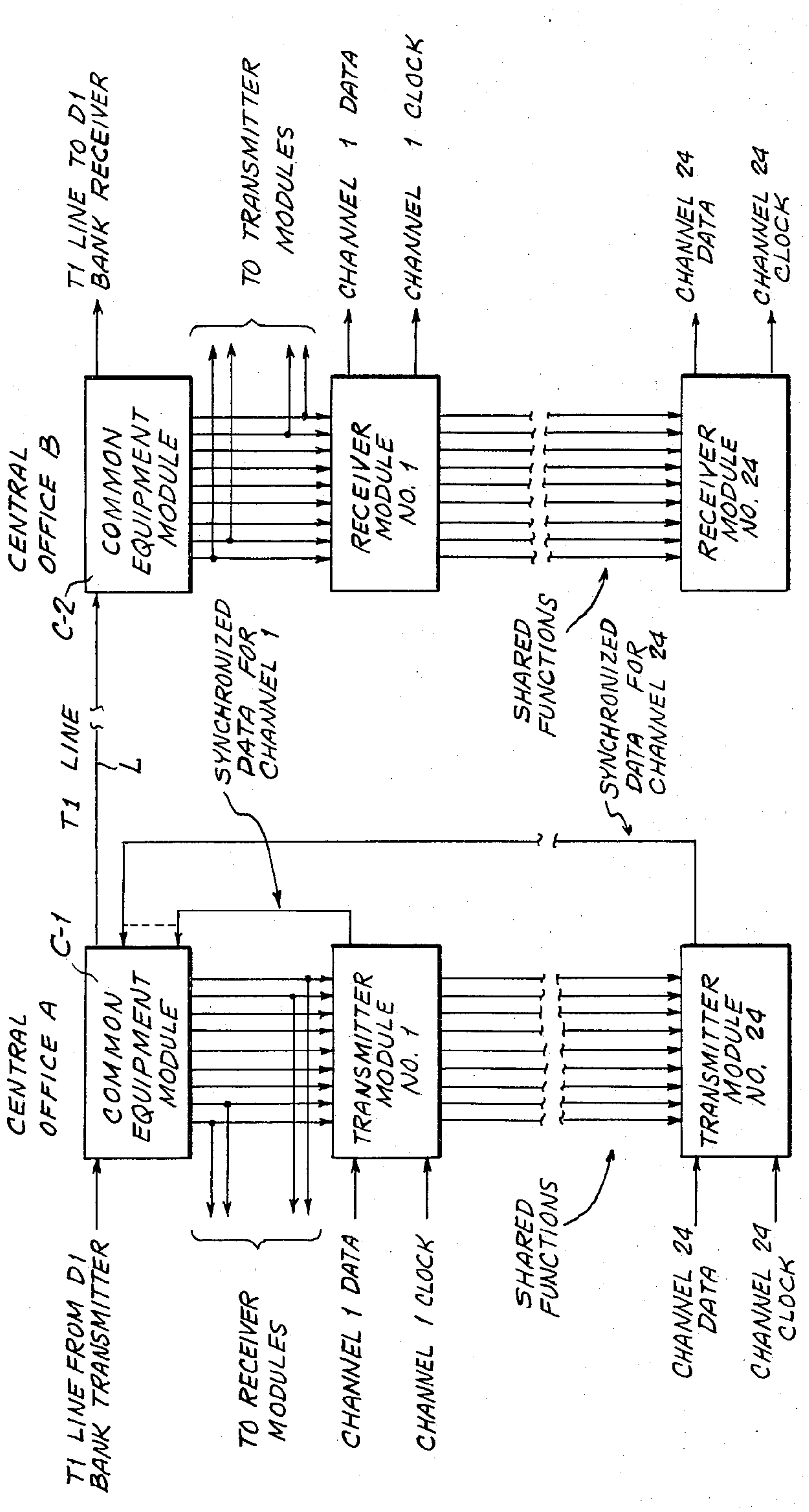
FIG. 2 is similar view showing more in detail the manner in which the transmitter, receiver and common equipment modules of the data transmission system of this invention are applied to the T1 carrier system.
Figure 5A:
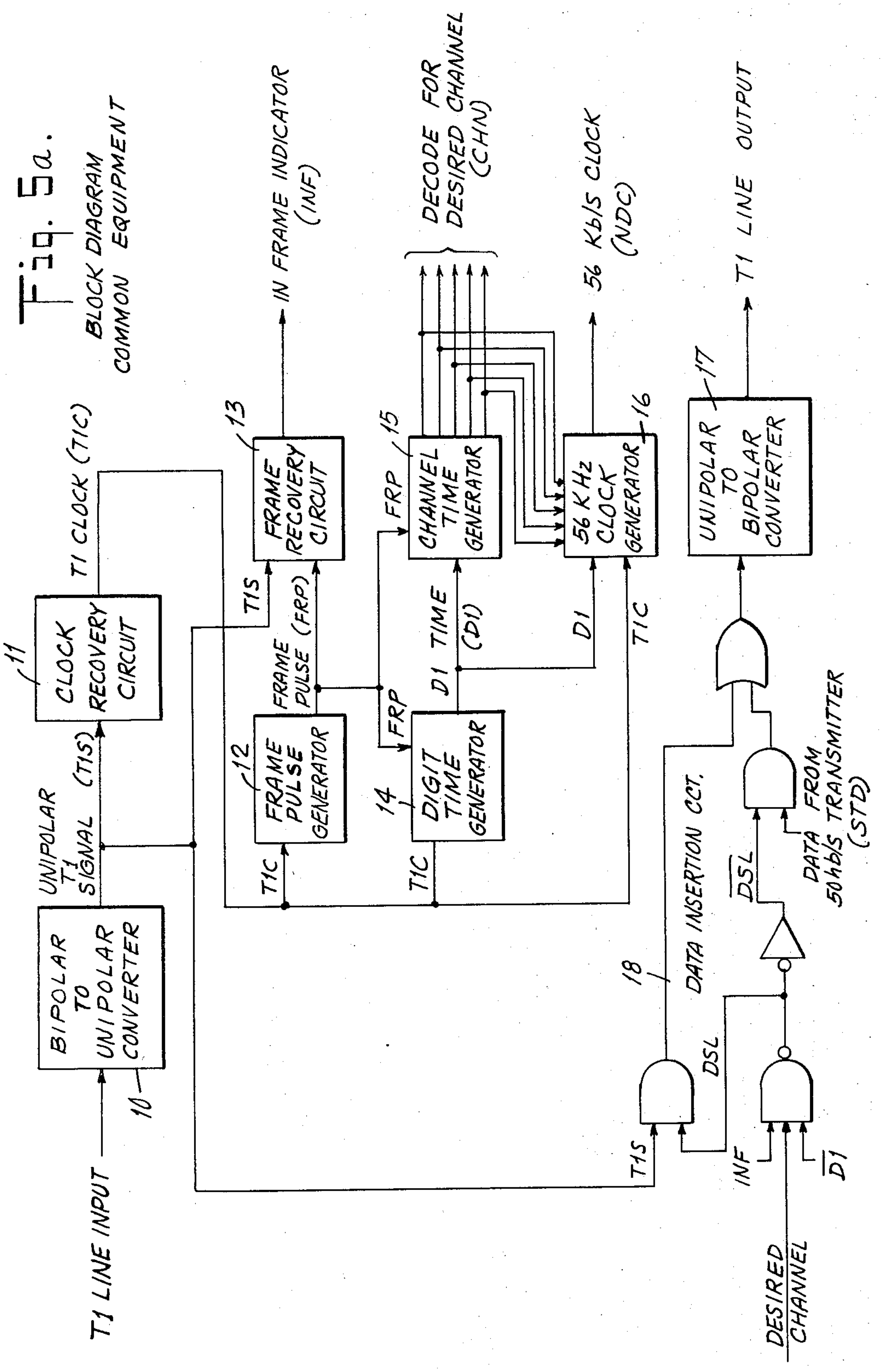
Figure 5B:
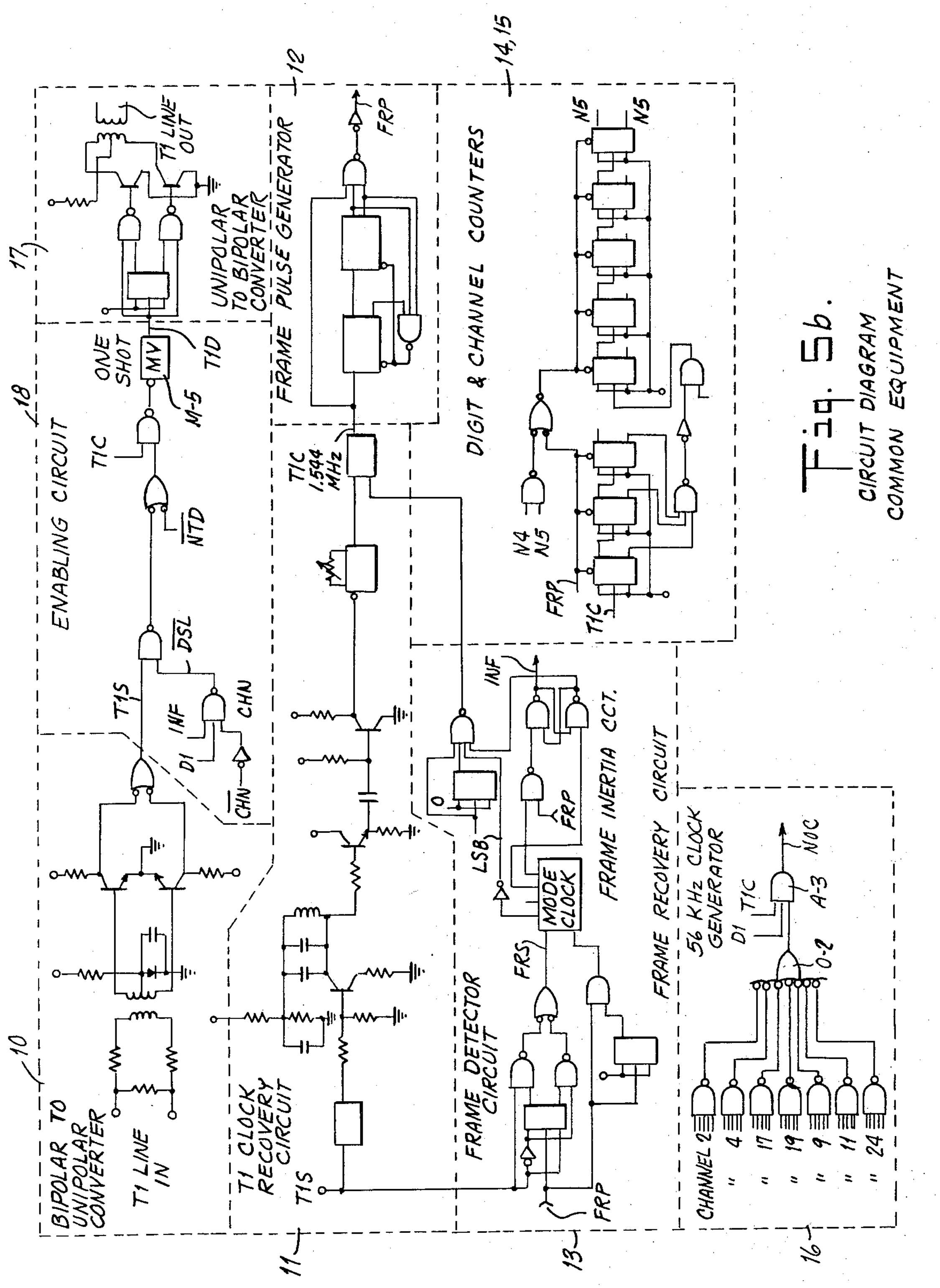

FIG. 5*a* is a block diagram and FIG. 5*b* a circuit diagram of the common equipment module of FIG. 2.

Figure 6:
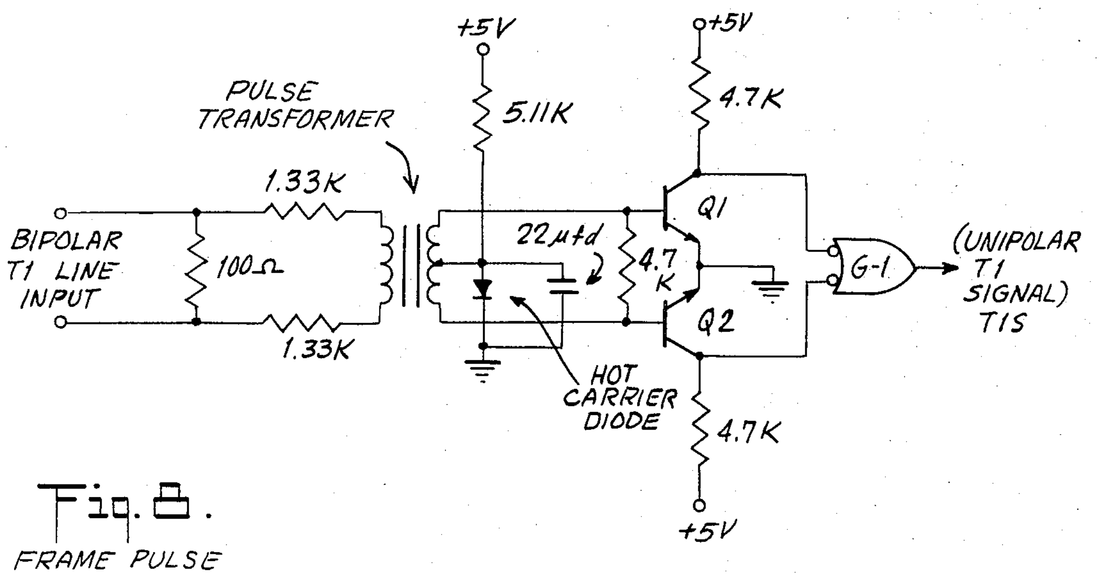
Figure 8:
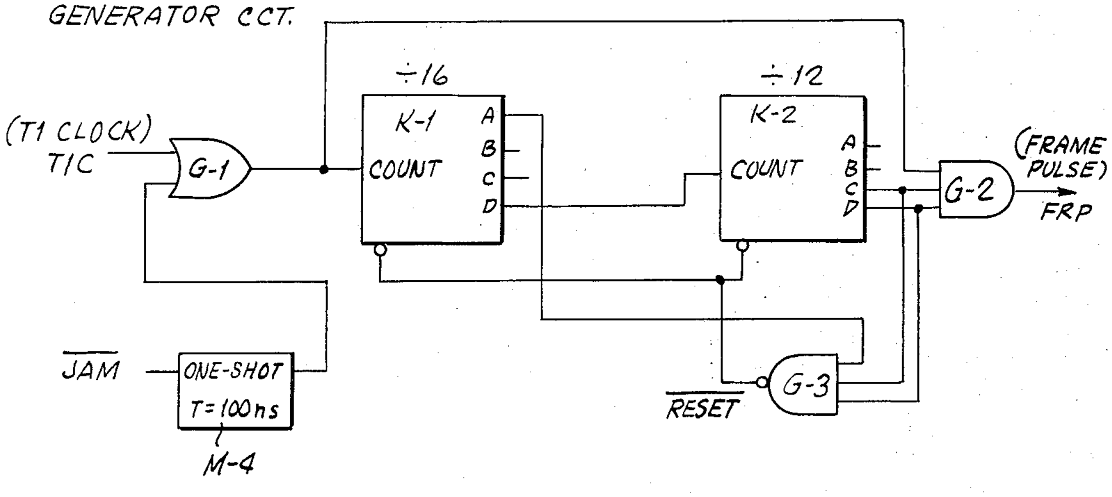
Figure 9:
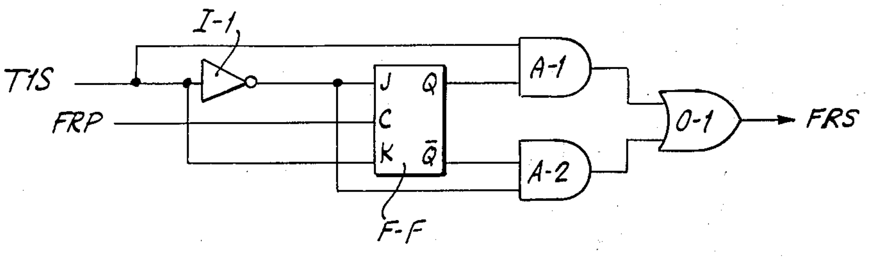
Figures 7, 7A, 7B, 7C:
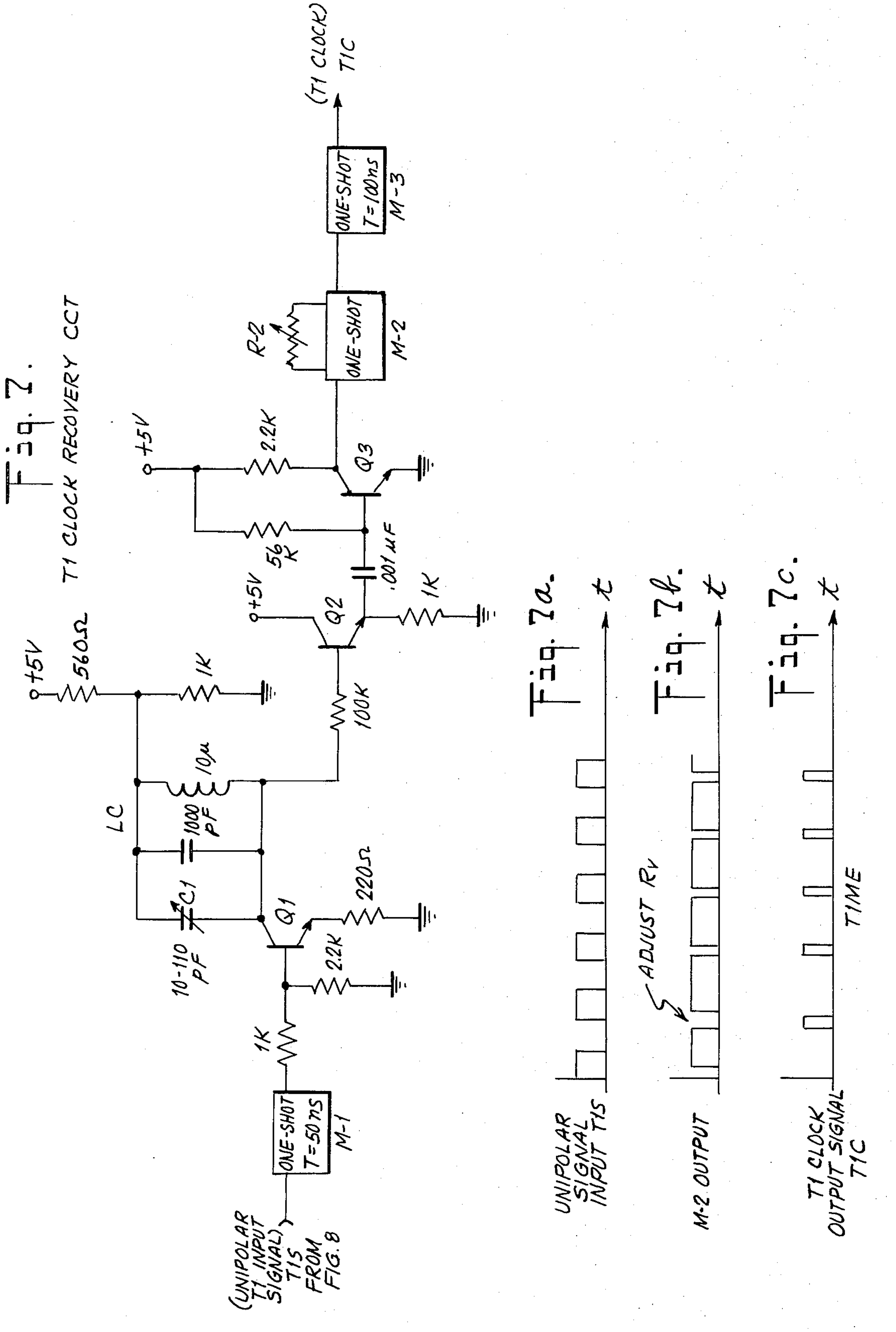
Figures 10, 11, 12:
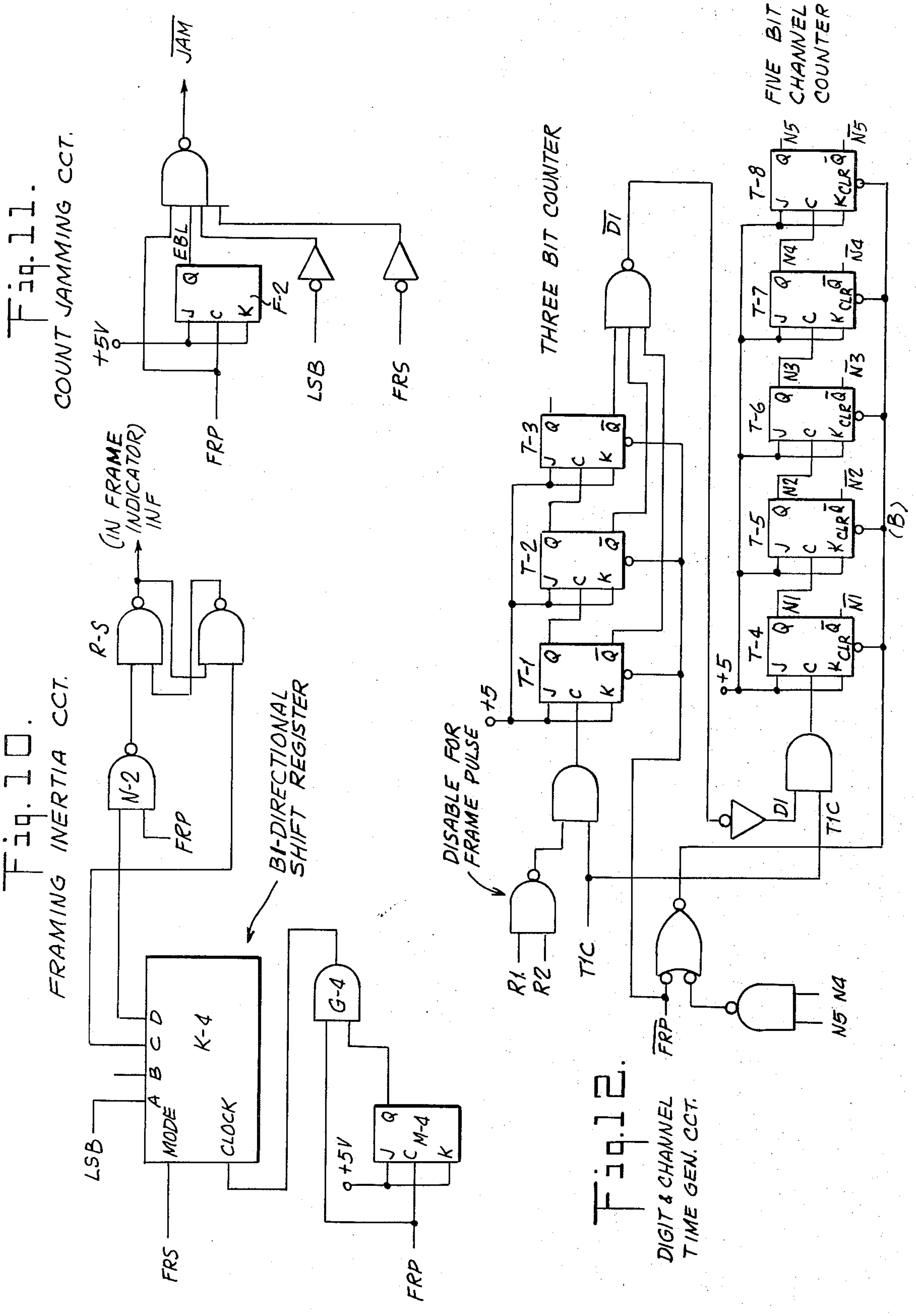

FIGS. 6–13 inc. are circuit diagrams of various components of the common equipment module shown in FIGS. 5*a* and 5*b*, and comprising respectively: the bipolar-to-unipolar recovery circuit, FIG. 6; the T1 clock recovery circuit, FIG. 7, and accompanying timing diagrams plotted graphically in volts against time, FIGS. 7*a* –7*c* inc.; the frame pulse generator circuit, FIG. 8; the framing detector circuit, FIG. 9; the framing inertia circuit, FIG. 10; the count jamming circuit, FIG. 11; and the digit and channel time generator circuits, FIG. 12.

Figure 13A:
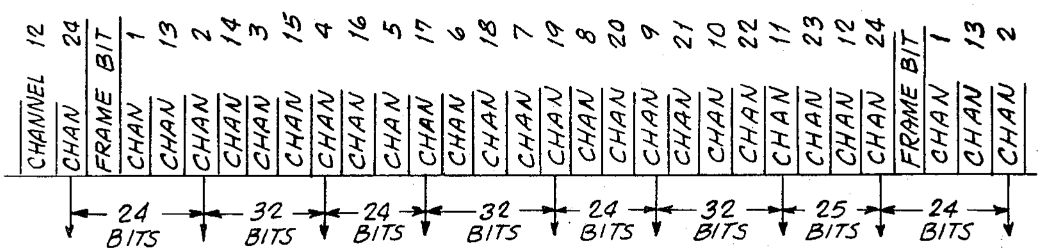
Figure 13B:
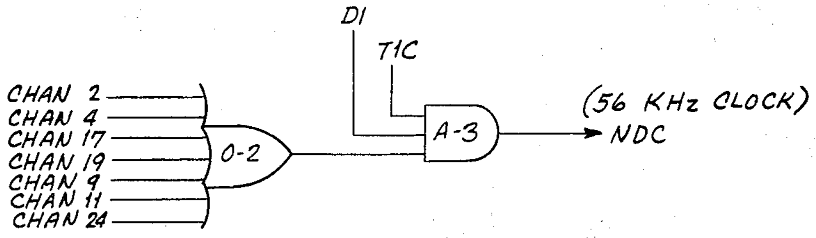

FIG. 13*a* is a graphical showing of a format for synchronizing a 50 kb/s data stream with the 56 kb/s data stream of the T1 system; while FIG. 13*b* shows a 56 kHz clock generator circuit.

Figure 14A:
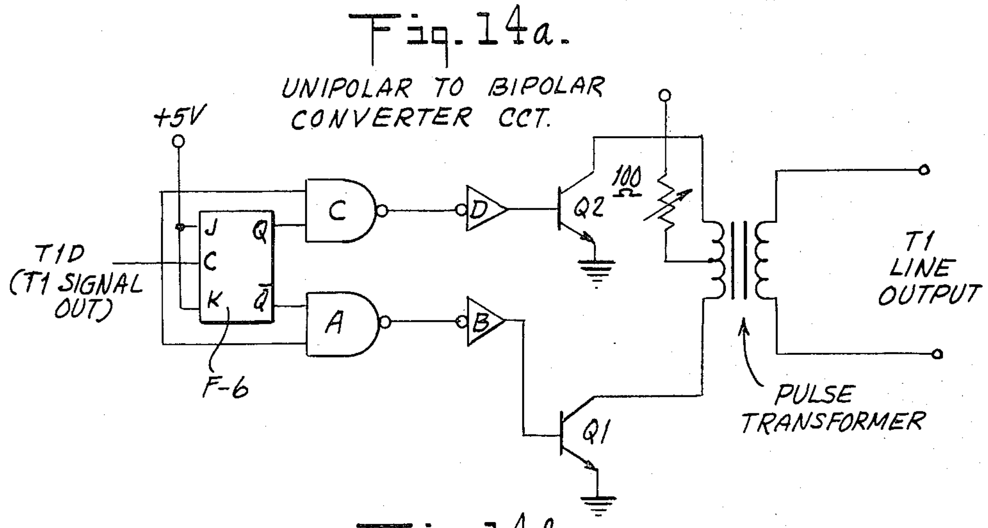

FIG. 14*a* shows a circuit for converting unipolar to bipolar data; while 14*b* shows an enabling circuit therefor.

Figure 15A:
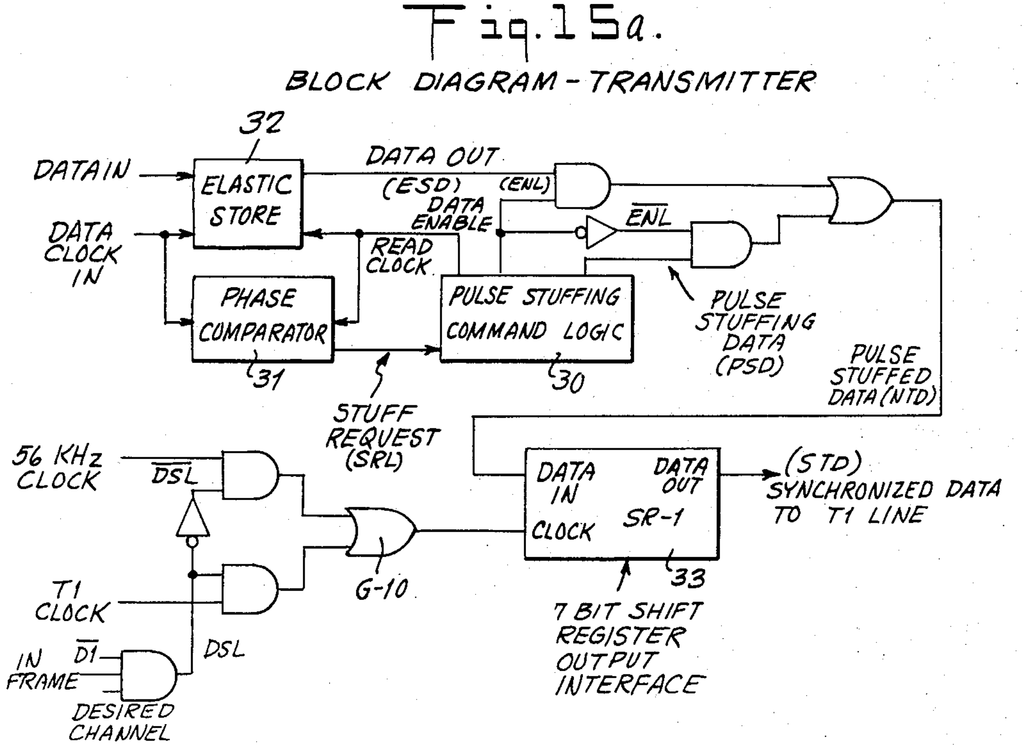

FIG. 15*a* is a block diagram and FIG. 15*b* a circuit diagram of the transmitter module of the invention.

FIG. 16 is a circuit diagram of the pulse stuffing circuit component of FIGS. 15*a* and *b;*

Figure 18:
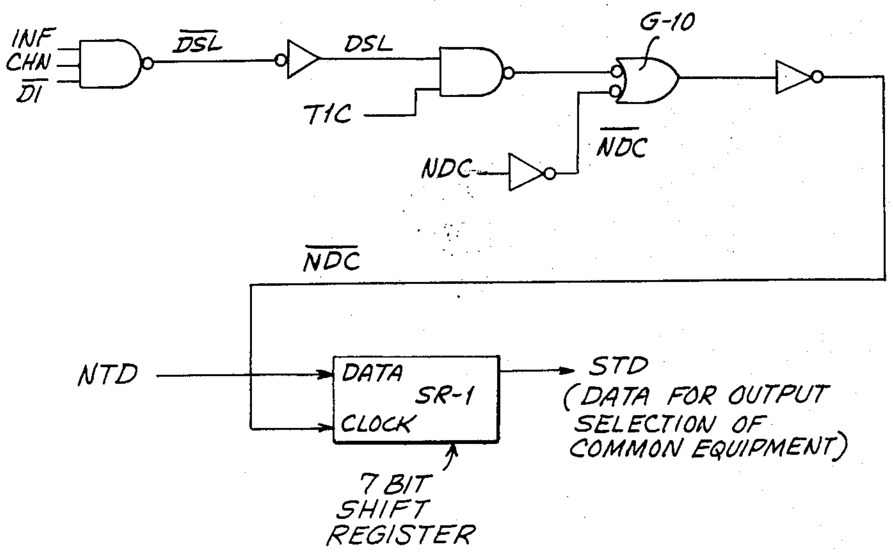
Figure 17:
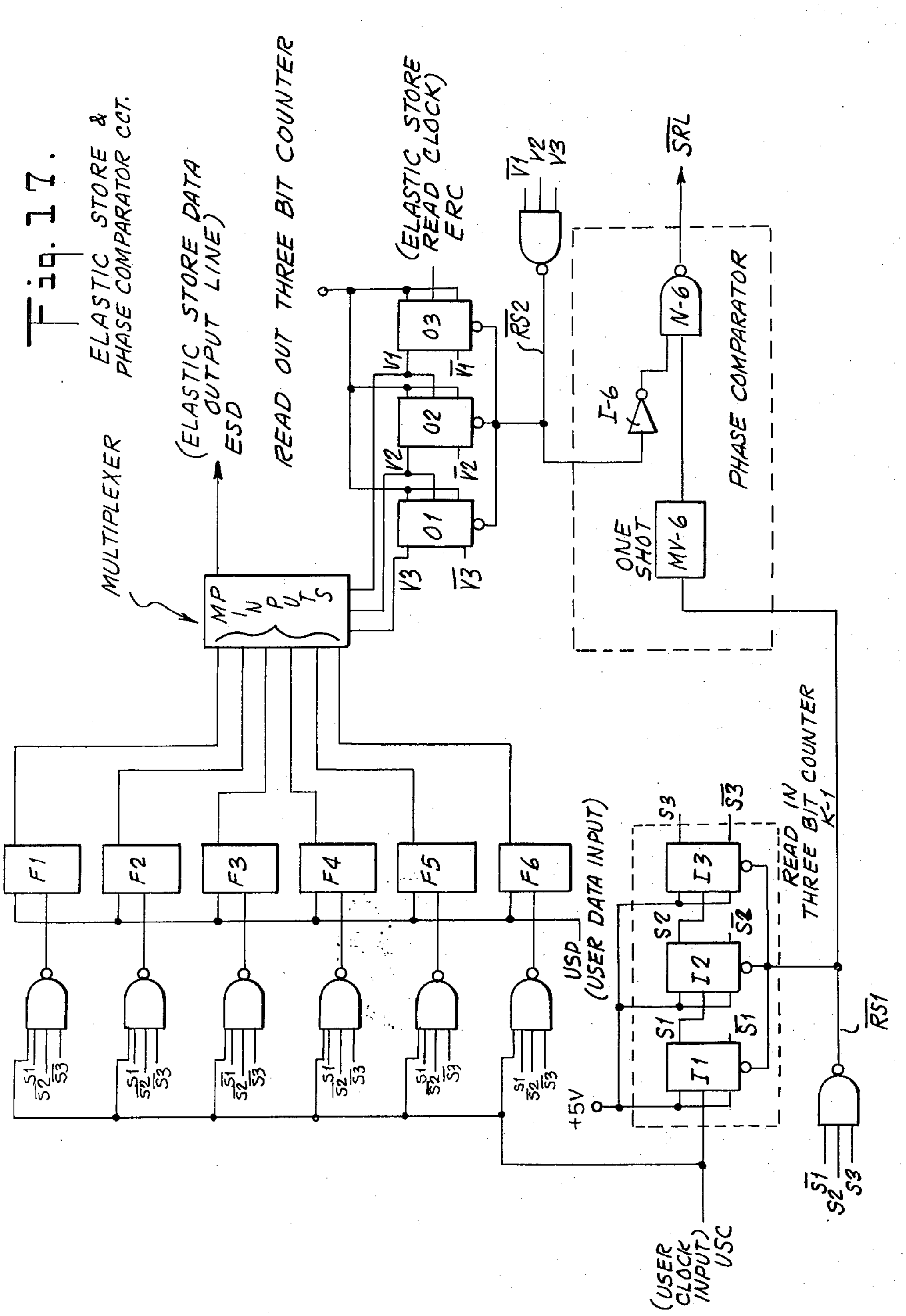

FIG. 17 a circuit diagram of the elastic store and phase comparator components thereof; and FIG. 18 a circuit diagram of the output interface circuit thereof.

FIG. 19*a* is a block diagram and

Figure 19:
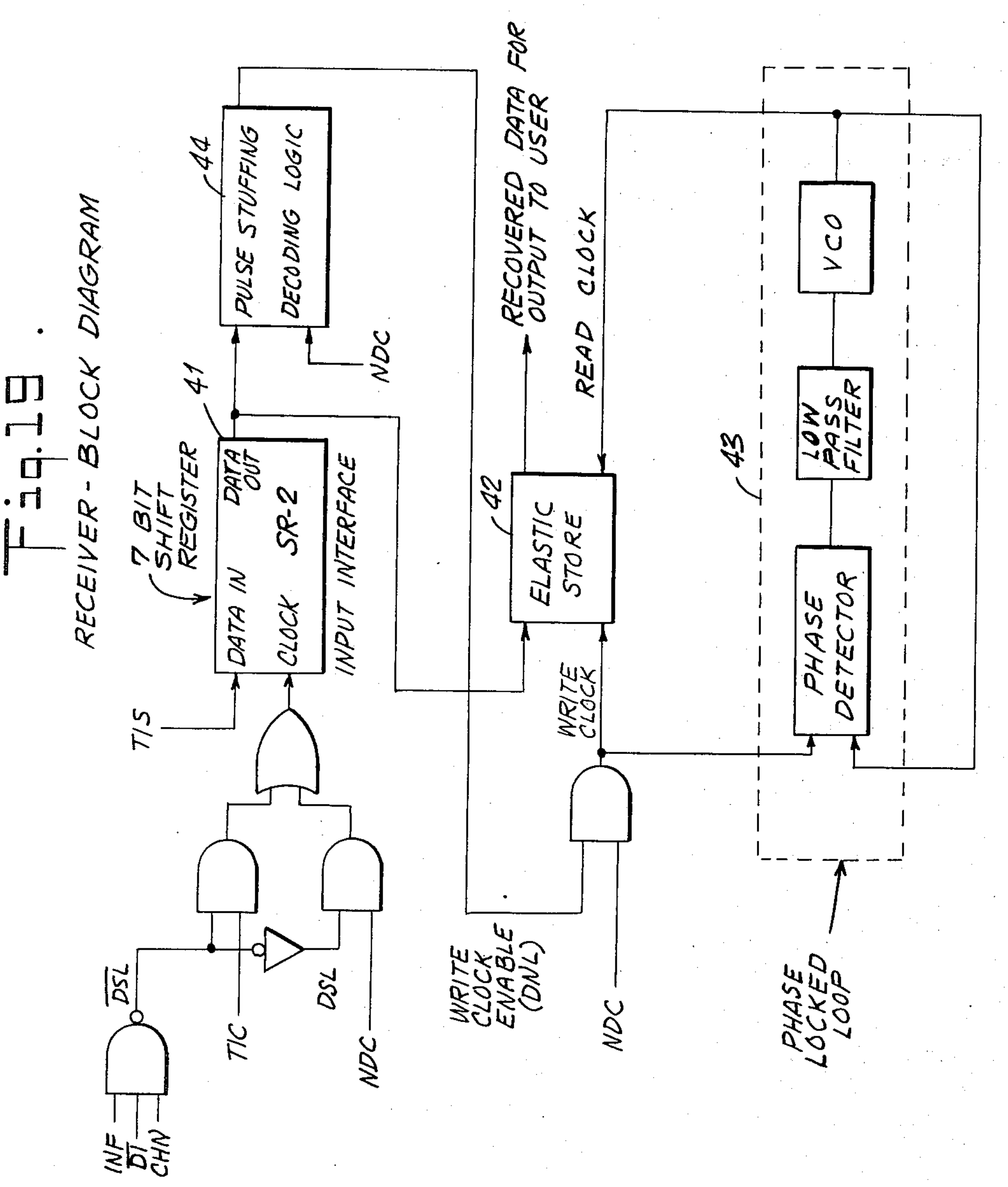
Figure 19B:
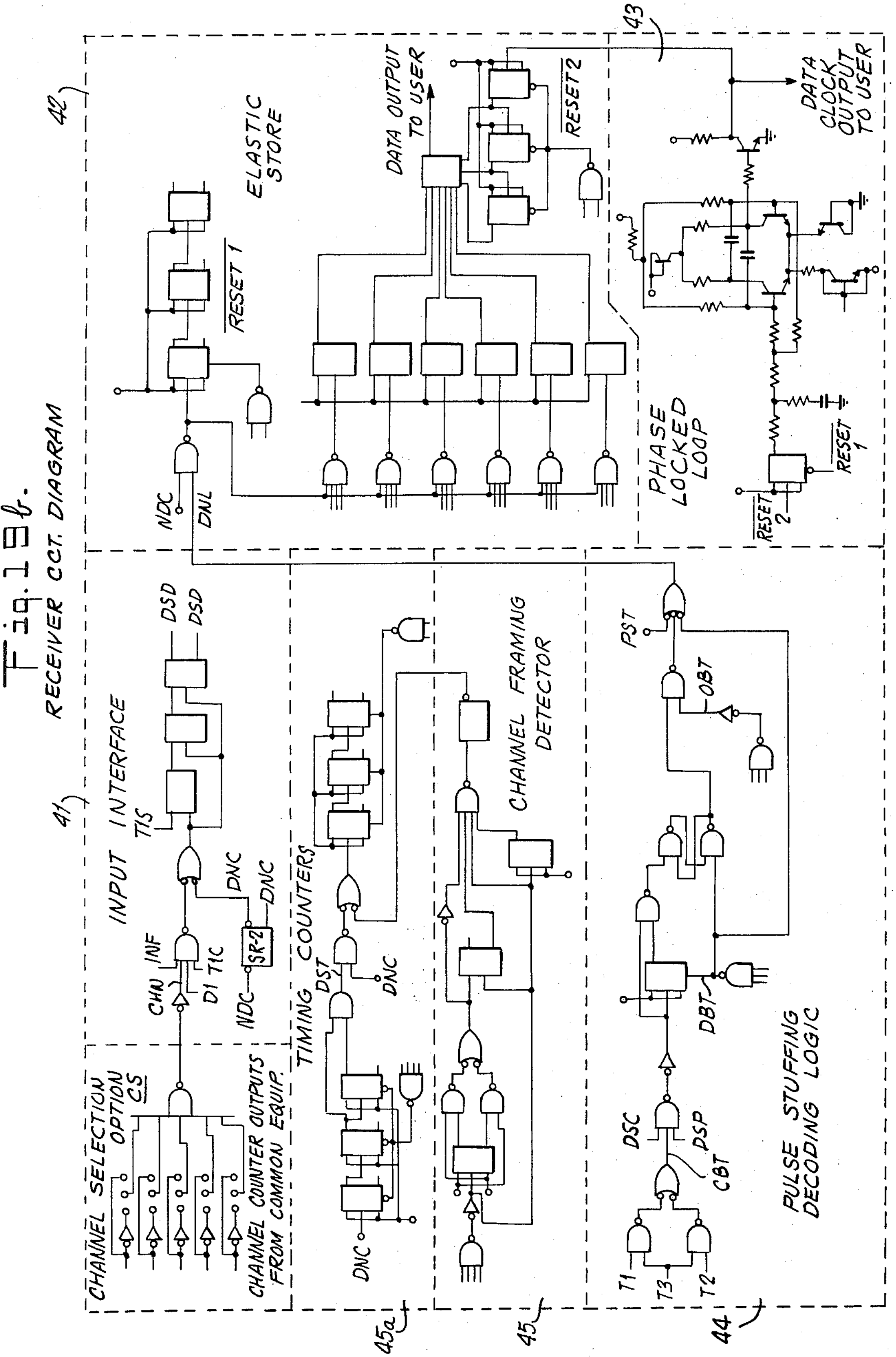

FIG. 19*b* a circuit diagram of the receiver module of the invention.

Figure 20:
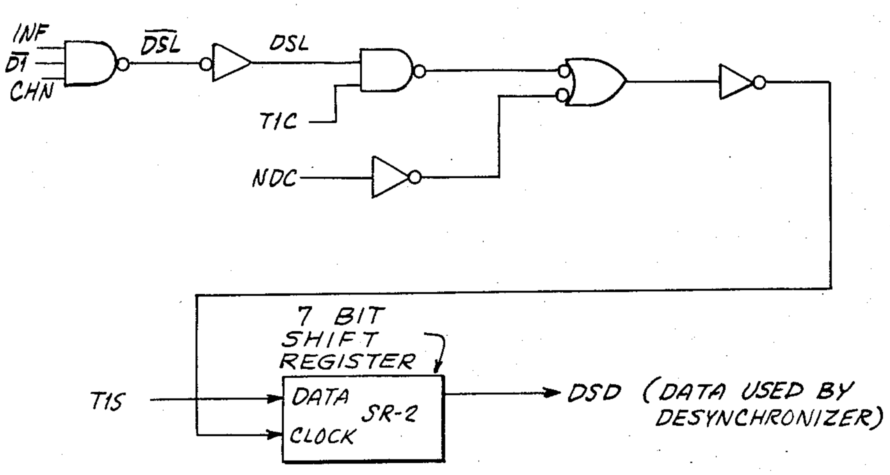

FIG. 20 is a circuit diagram of the input interface circuit component of FIGS. 19*a* and *b;*

Figure 21:
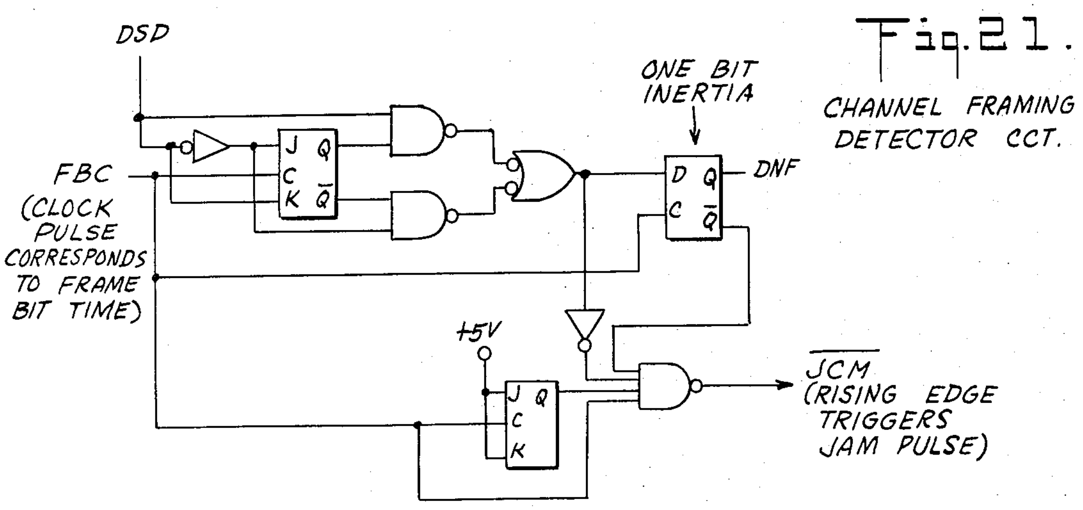
Figure 22:
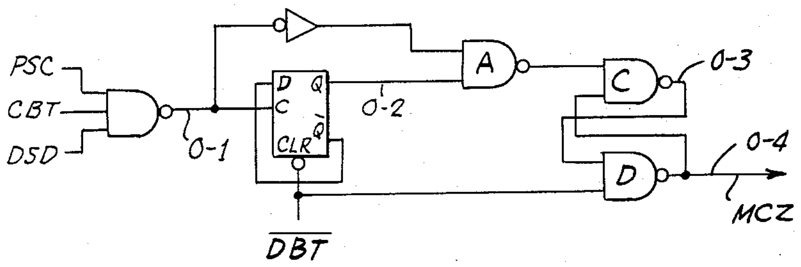
Figure 23:
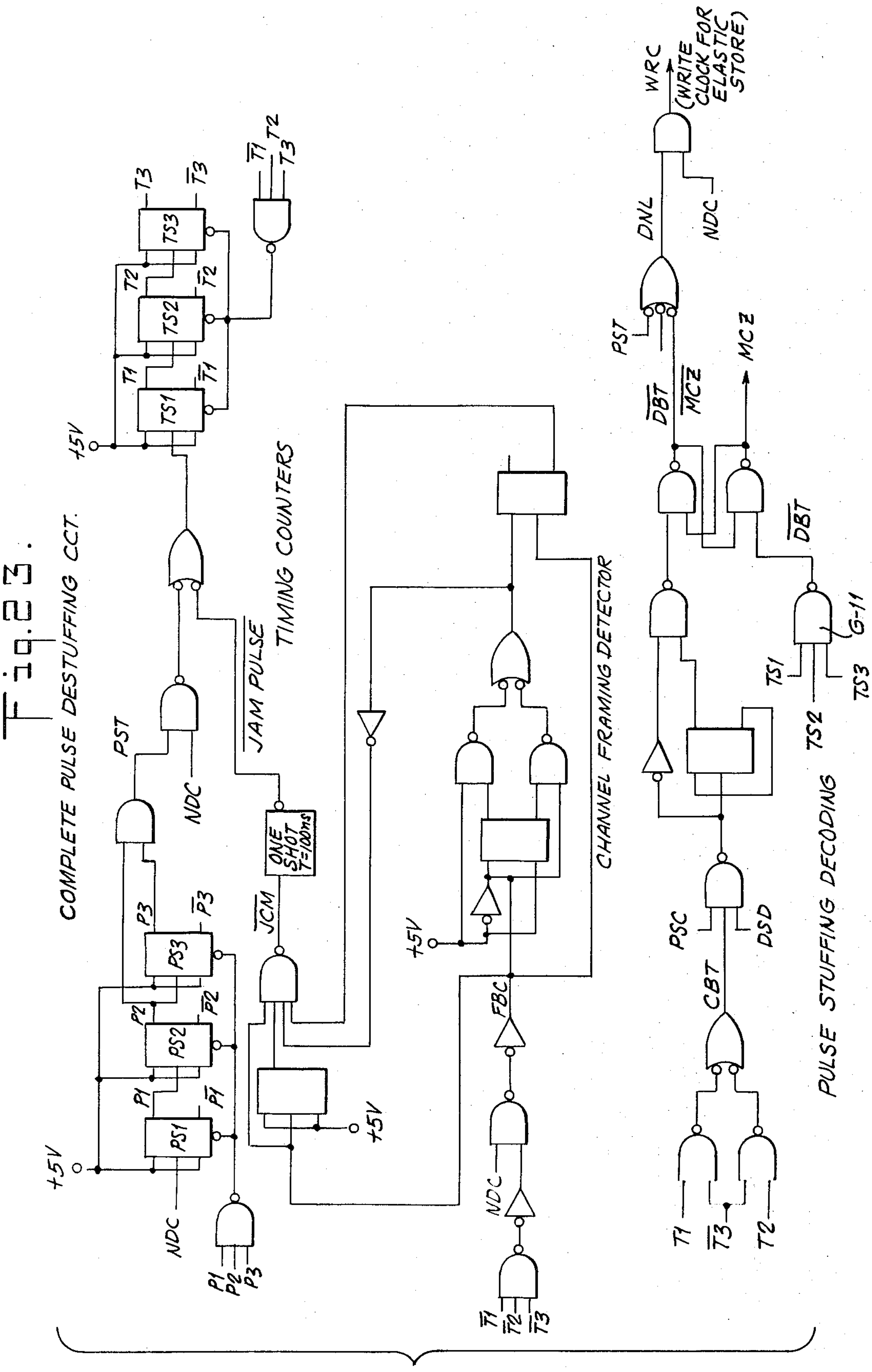
Figure 4:
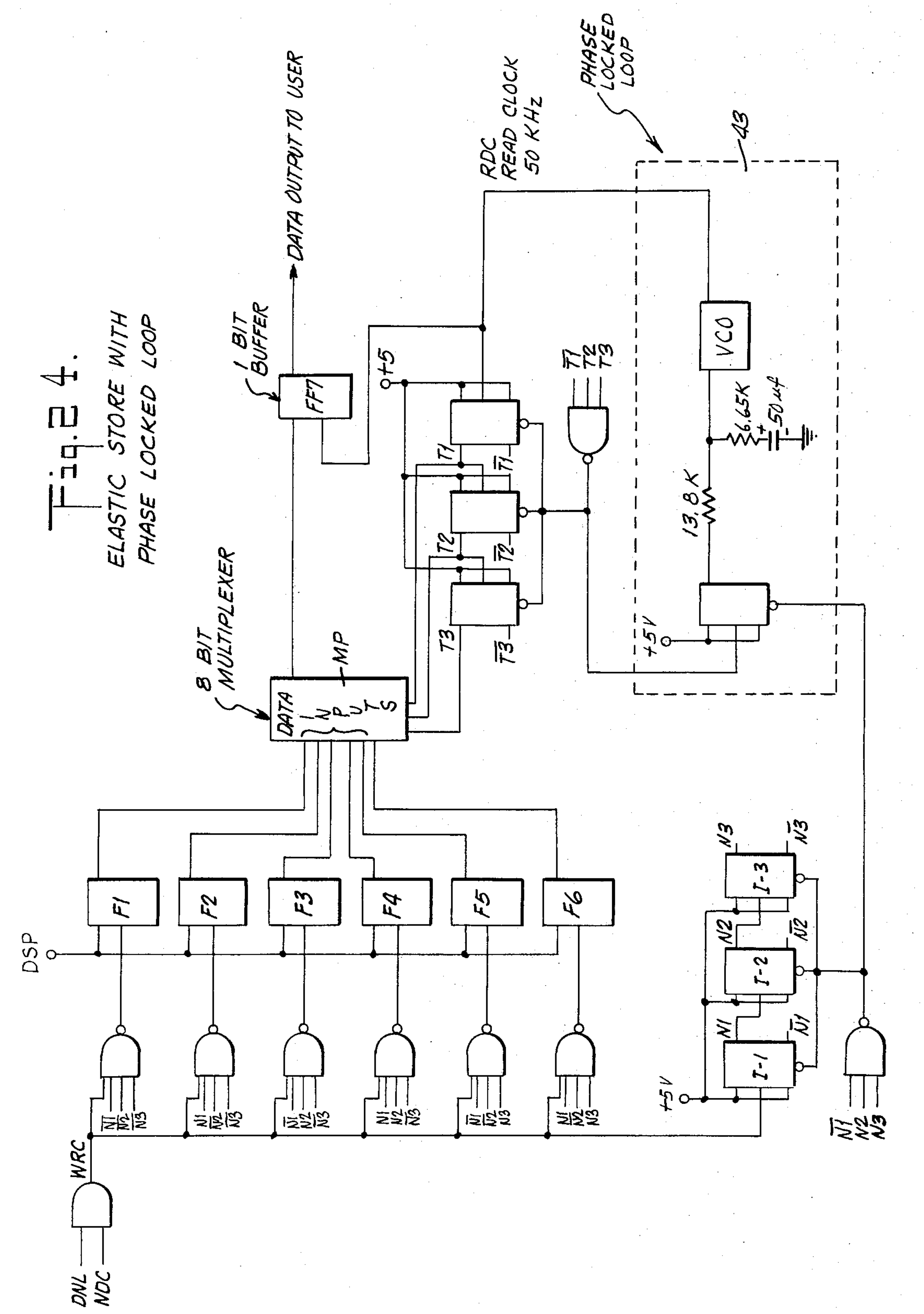

FIG. 21 is a circuit diagram of the channel framing component thereof;

FIG. 22 is a circuit diagram of the control bit majority determination component;

FIG. 23 is a circuit diagram of the pulse destuffing and decoding logic component;

FIG. 24 is a circuit diagram of the elastic store and associated phase locked loop components.

Figure 1:
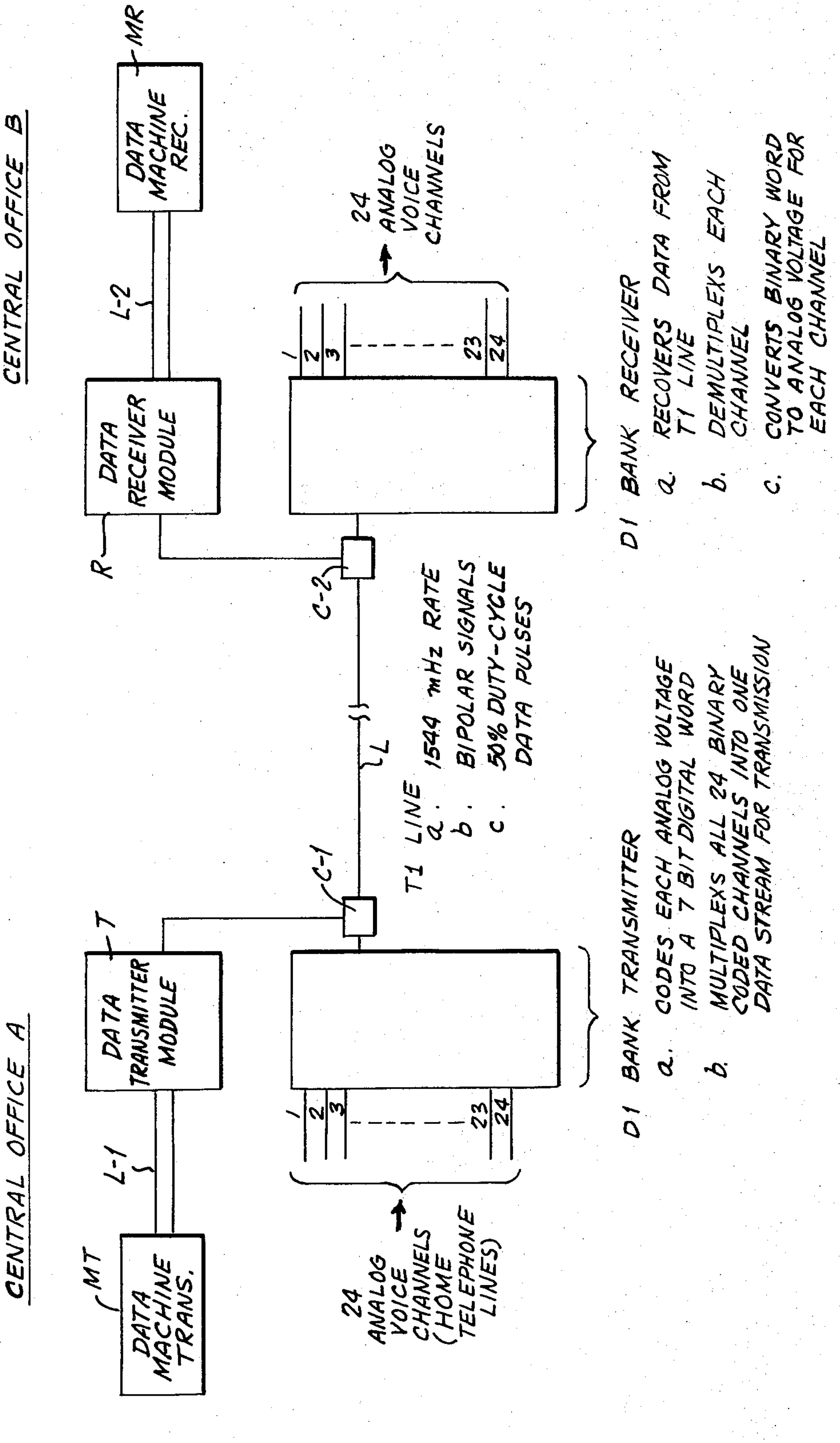

Referring to FIG. 1, there is shown at central offices A and B, respectively, the D1 transmitter and receiver banks of the T1 carrier system, interconnected by the common transmission facility L, which is traversed by the bipolar bit stream at a 1.544 MHz rate, produced at the transmitting end by multiplexing analog speech from the 24 voice channels followed by voice-to-pulse conversion, compressing and encoding into a composite bipolar signal sequence transmitted at 1.544 MHz over facility L to the receiving end. At the receiving end the bit stream is converted to unipolar, expanded, decoded and demultiplexed into the appropriate receiving voice channels.

For data transmission in accordance with the present invention, a data transmitter module T and a data receiver module R, each in accordance with the invention as described below, are, respectively, coupled to the common transmission facility L via common equipment modules C–1 and C–2. The transmitter T receives a data stream via lines L–1 from a data machine in synchronous (with clock) or asynchronous (without clock) fashion, connected thereto and transmits the data over transmission facility L to the receiver R which in turn transmits the same via lines L–2 to a data machine MR connected thereto in synchronous (with clock) or asynchronous (without clock) fashion. Thus in accordance with the above mentioned feature of the invention and as shown in FIG. 1, the data stream completely by-passes the D1 transmitter and receiver banks of the T1 carrier system, with accompanying advantages as above noted. An alternative, completely compatible, physical realization of the composite common equipment, transmitting, and receiving modules is the self-contained, plug-in transmitter and receiving module which may be inserted in the D1 bank of the T1 carrier system at either end as described in a copending application of W.F. Haskett, et al., Ser. No. 281,195, filed Aug. 16, 1972.

Referring to FIG. 2, the common equipment modules C–1 and C–2 are each connected at each central office A or B to a number of transmitter and receiver modules according to the invention for providing duplex operation in either direction of data transmission.

As above noted, each digit time slot in a T1 channel has a 8 kHz capacity due to the T1 sampling rate of 8 kHz. Therefore, if it is desired to transmit 50 kb/s data over one channel the following conclusions are arrived at.

1. 6 bits = 48 kHz is not enough capacity.
2. 7 bits = 56 kHz is too much capacity.

Figure 3:
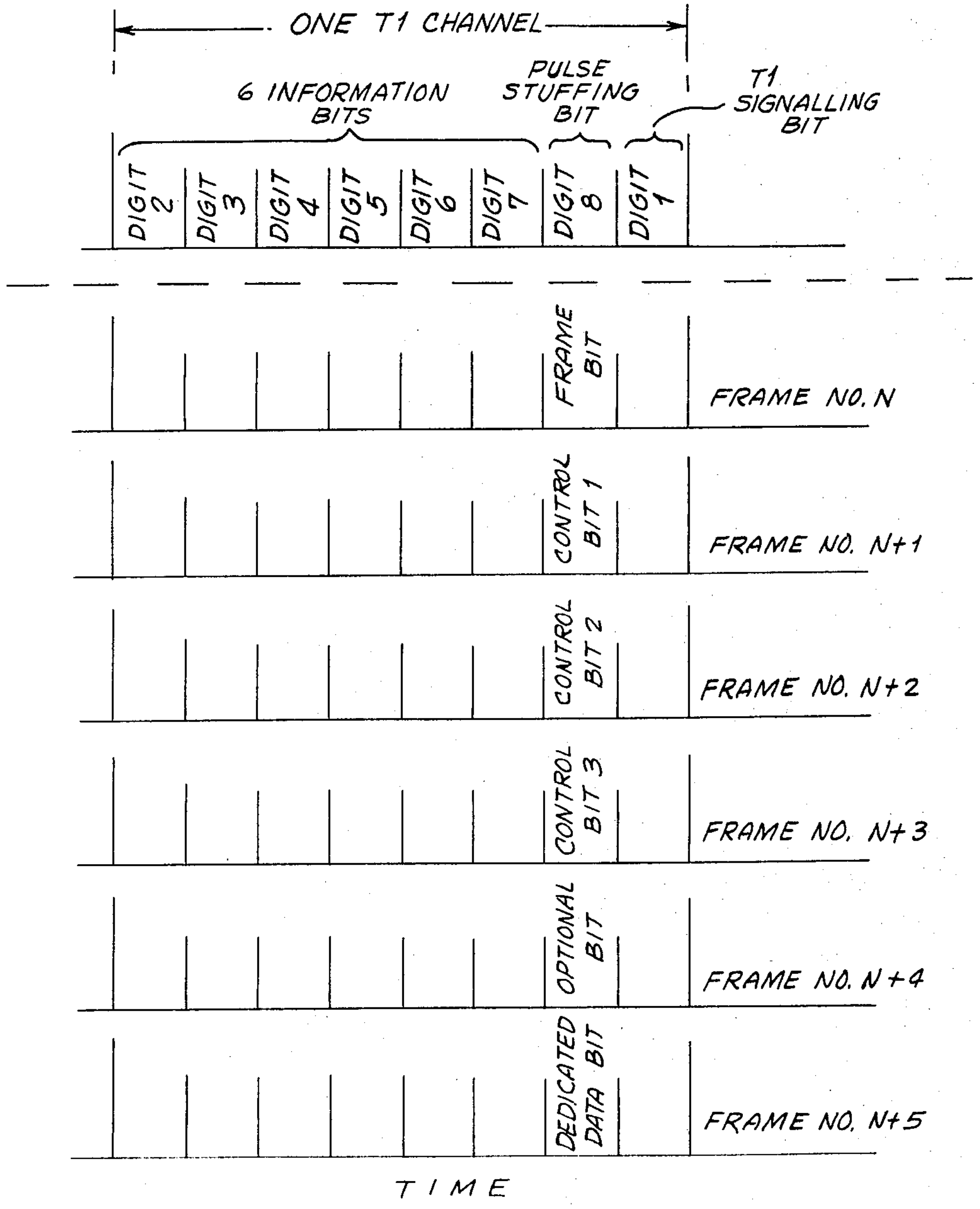
FIG. 3 is a graphical presentation of a pulse stuffing format in accordance with this invention for adapting a 50 kb/s data stream to a single T1 carrier channel.

Since seven bits is too much capacity, some of the extra bits can be used for pulse stuffing by well known methods and as described below, thus providing exactly 50 kb/s capacity and still provide synchronism with the T1 carrier rate. Consider now a specific channel format that will allow 50 kb/s data service over one T1 carrier channel. A diagram of such format is shown in FIG. 3. As therein shown the T1 channel in this format has six information bits and one bit that is time shared to carry information concerning pulse stuffing. This information tells the receiver when it is going to receive a stuffed pulse and when it is going to receive a data pulse.

Looking at the format it is seen that the first time shared bit is a framing bit. This bit alternates between a 1 and a 0 just as the T1 framing bit does and it serves much the same purpose. It allows the receiver to lock into synchronization with the transmitter on a channel basis.

The next three time shared bits are control bits. These bits determine whether the fifth time shared bit, the optional bit, is a stuffed bit or a data bit. A majority vote is taken of the three control bits, with a 1 majority indicating a stuffed bit, and a 0 majority indicating a data bit. The optional bit is reserved for use as a stuffed pulse or a data pulse depending upon the needs of the transmitter. The last bit in the time shared sequence is always a data bit and is called a dedicated data bit.

With this format in mind, let us determine how it will permit the transmission of 50 kb/s data. Each bit has an 8 kHz capacity and therefore the six data bits in each channel give us a 48 kb/s capacity. The framing bits and control bits add nothing to the capacity. The dedicated data bits adds one-sixth of 8 kHz, since it is present only once out of every six frames, or 1⅓ kb/s of capacity. We now have a channel capacity of 49⅓ kb/s. With the optional bit we now can vary our total capacity. If the optional bit is continuously stuffed and thus carries no information, we have a channel capacity of 49⅓ kb/s. If we never stuff the optional bit and therefore it always contains information, it will add one-sixth of 8 kHz to 49⅓ kb/s to produce an upper limit of 50⅔ kb/s capacity.

From the above, one can see how it is possible to accommodate 50 kb/s data on a single T1 carrier channel. We can allow the nominal 50 kHz rate to vary by ⅔ kHz and still be able to transmit it with the given format. At the receiver we will be able to remove all the stuffed pulses and reconstruct the input data rate if we provide a mechanism to smooth the resulting pulse train. Such a mechanism is a phase locked loop as discussed below.

With this background it is now possible to describe the basic design of the 50 kb/s data terminal that will be needed. The basic design constraints are that the system be able to: (1) Pre-empt any single selectable channel of the T1 system for data transmission; (2) Accept user clock and associated 50 kb/s data with a tolerance of ± 100 b/s NRZ data from a TTL interface; and (3) Reduce output phase jitter to a level suitable for interfacing with a TTL shift register.

As above stated, the basic design concept of the data terminal of the invention is that it be modular in nature, i.e., that the transmitting section of the terminal be separate from the receiving section and that each section be removable simply by removing a plug-in module.

A primary concern also is that additional data channels can be added at a reduced per channel cost. This requires that certain functions be shared by all transmitters or by all receivers. Transmitters and receivers cannot share the same equipment, however, since they must operate on different T1 lines. The functions that can be easily shared are those pertaining to the T1 line such as clock recovery, data recovery, and frame pulse generation.

These basic concepts resulted in an apparatus of the invention in which there are three basic modules. These modules are: (1) Common Equipment Module — This equipment will provide all those functions which may be shared by all transmitters or receivers working on the same T1 line; (2) Transmitter Module — This equipment will provide all the pulse stuffing functions necessary to allow transmission of the 50 kb/s data over a single preempted T1 channel; (3) Receiver Module — This equipment will recover the 50 kb/s data and the associated data clock from the T1 line. The data will be provided at the output with a suitably low level of phase jitter. A block diagram of such a data transmission system according to the invention is shown in FIG. 2 above discussed.

All transmitters (or receivers) that are used on the same T1 line will need to perform certain functions that can be done by one unit and shared by all the others. These common functions are: recovery of unipolar data from bipolar T1 line signal; recovery of the T1 clock from the input data; recovery of the framing signal from incoming signal and generation of a framing pulse; generation of digit and channel times; generation of a 56 kHz clock that is synchronous with the T1 system; transmission of synchronized 50 kb/s data in correct channel slots; transformation of unipolar data to bipolar data for transmission over the T1 line.

The above functions are performed by the common equipment module, the circuit of which is shown in block diagram form in FIG. 5*a* and in circuit diagram form in FIG. 5*b*. In FIG. 5*a* the components shown as blocks and numbered 10–17 inc., are shown in FIG. 5*b* as the like numbered dashed line enclosures for the corresponding circuits of these components, respectively. The following description details the design of each component of the common equipment.

The recovery of a unipolar signal from the bipolar signal is a process that must be done every time TTL logic of this invention must be interfaced with the T1 line. A circuit for doing this is shown at 10 in FIG. 5*a* and in FIG. 6.

Figure 4:
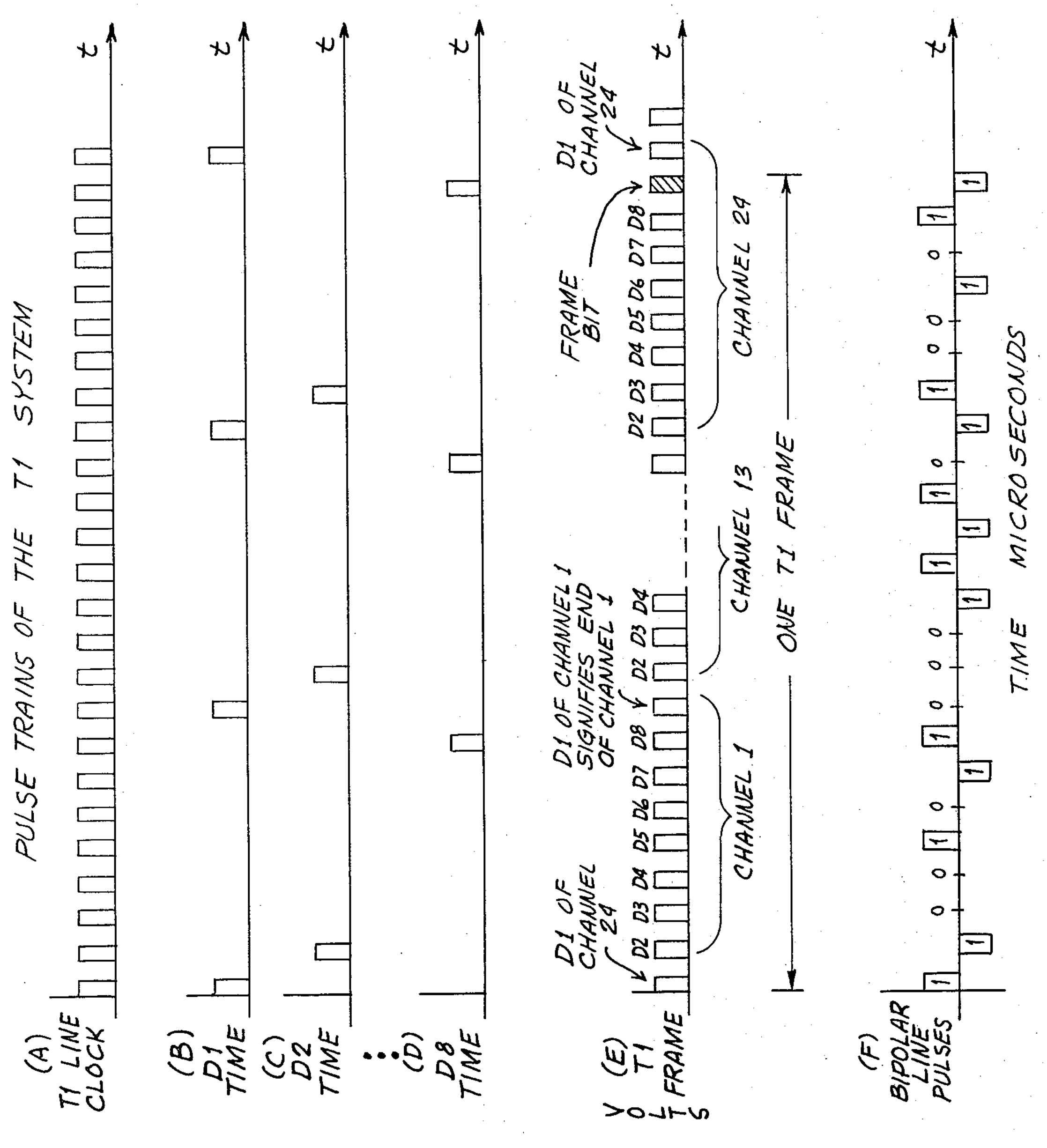
FIG. 4 is a graphical plot in volts against time of pulse trains of the T1 system pertinent to the present invention.

The T1 line signal is made up of bipolar pulses as shown in FIG. 4 at F. A pulse of either polarity corresponds to a 1 and the absence of pulses of either polarity indicates a 0. Referring to FIG. 6, the hot carrier diode shown on the center tap of the transformer secondary is used to bias the transistors Q1 and Q2 very near the conduction region. When an input pulse of either polarity which has an amplitude greater than 1.5V (nominal T1 line pulses are 3V in amplitude) appears as an input to the transformer, the secondary of the transformer will produce a 0.4V pulse. One of the transistors will be forced into saturation while the other is cut off, driving one input to the TTL gate, low and thus forcing a 1 output. This will occur for either polarity input, and the output pulse width will be dependent upon the input pulse width. The output is now TTL compatible and may be used throughout the entire system.

The circuit for recovery of the T1 line clock pulses is shown at 11 in FIG. 5*b* and in FIG. 7. Referring to the latter, the input to the "one-shot" multivibrator M–1 is the T1S output signal from FIG. 6, and is plotted in FIG. 7*a*. Each rising edge of the T1S data signal triggers M–1 which provides a pulse of 50 ns duration to the transistor Q1. This causes Q1 to apply a current pulse to the LC tank circuit in the collector. This current spike causes the tank circuit to oscillate at the resonant frequency which is set to 1.544 MHz by adjusting the variable capacitor C–1 thereof. The Q factor of the tank circuit must be high enough so that the clock circuit will remain in synchronism even if the input data should have a string of fourteen 0's. The transistor Q2 acts as an emitter follower to buffer the output of the LC tank circuit. Transistor Q3 provides enough gain to drive its collector into saturation, providing a logic compatible output. This output is then fed into the one-shot multivibrator M–2, that is set to trigger on the negative going edge of its input. The pulse width of M–2 is adjustable through the use of the potentiometer R–2. The output of M–2 is fed into the one-shot multivibrator M–3 which is also triggered on the falling edge of the input pulse thereto. M–3 is set to provide an output pulse width of 100 ns. This output is now used as the T1 clock pulses throughout the system. The phase of this clock with respect to the input data is adjustable through the potentiometer R–2 which is adjusted until the clock pulses are centered on the data pulses shown in FIG. 7*b*. The output from M–3 are the T1 clock pulses shown in FIG. 7*c*.

Once the T1 line clock pulses have thus been recovered from the input data stream, it is possible to lock onto the T1 framing bit to allow synchronization. The framing bit occurs every 193rd bit in the T1 format. It is necessary to count down the line frequency by 192 and generate a new pulse, called the framing pulse, on the 193rd clock pulse. This is done by means of the frame pulse generator circuit shown at 12 in FIG. 5*b* and in FIG. 8, and is accomplished through the use of two 4 bit binary ripple counters shown at K–1 and K–2 in FIG. 8, which receive the TIC output pulses from FIG. 7 via input gate G–1. The output gate G–2, FIG. 8, generates the frame pulse every 193rd clock pulse. This frame pulse then serves as the clock pulse input to a framing detector circuit. The frame pulse generator circuit automatically resets itself via gate G–3 on the falling edge of the frame pulse.

The framing detector circuit is shown at 13 in FIG. 5*b* and in FIG. 9. It receives the framing pulse FRP from FIG. 8 and also the unipolar TIS signal from FIG. 6. The frame detector output FRS will be a 1 at the time of the frame pulse if the data associated with the frame pulse is alternating between a 1 and a 0. This is accomplished by means the circuit shown comprising an inverter I–1, a J-K flip-flop F—F, two AND gates A–1 and A–2, an OR gate 0–1.

In order to insure reliable operation, it is necessary that provisions be made for possible errors in the framing bit. This is done through the use of inertia. Inertia simply means that the framing detector must register the out of frame condition for several frames before the circuit will look at another bit as the possible framing bit. Four frames of inertia is adequate. It is necessary for the data terminal to get into frame after the T1 line and drop out of frame before the T1 line does so that the data terminal does not hinder the operation of the T1 line. This is accomplished by means of the frame inertia circuit shown at 13 in FIG. 5*b* and in FIG 10.

The output FRS, FIG. 9, of the framing detector is applied to the mode control of a four-bit, bi-directional shift register K–4, FIG. 10, which receives a clock pulse every other frame pulse via flip-flop M–4 and gate G–4. If the mode control is a 1, a clock pulse will cause a 1 to be shifted into the left side of the shift register. If the mode control is a 0, then a clock pulse will cause a 0 to be shifted into the right side of the register. If the right most bit of the register is a 1, then the circuit has been in frame for four clock pulses or eight frames. The next frame pulse via the NAND gate N–2, will therefore set the R-S flip-flop that is used to indicate the in frame condition.

If the circuit should get out of frame the register will start filling with 0's from right to left. When the 1's have fallen back to the second bit of the register, it will indicate the circuit has been out of frame for four frames. Since the T1 line has an inertia of approximately four frames, it is necessary that the data terminal stop pre-empting a channel for data transmission. In other words the data terminal must drop out of frame. This is done by having the low signal on the third bit of the register reset the in-frame indicator flip-flop.

If the circuit is out of frame for eight frames the framing circuit must examine the next bit position in the T1 bit stream to determine if it is the framing bit. This is accomplished through the use of a count jamming circuit.

Two things must be considered when designing this count jamming circuit. One thing to remember is that the framing bit can be either a 1 or a 0 and therefore we must examine each bit time for at least two frames to be certain that the 1 – 0 pattern is not present. Another thing to remember is that if we wish to add an extra pulse into the frame pulse generator via the $\overline{\text{JAM}}$ input shown in FIG. 8 in order to look at the next bit time, we must add that extra pulse at such time that it will not interfere with the T1 clock input. We can look at each bit time twice if we enable the count jamming circuit on alternate frames. We can assure no timing problems if we trigger the jamming pulse with the falling edge of the T1 clock.

The circuit designed to jam a pulse into the counter chain is shown in FIG. 11 which is part of the pulse stuffing command logic of the transmitter module discussed below. It can be seen from the diagram that $\overline{\text{JAM}}$ is given by the Boolean expression,*

$$\overline{\text{JAM}} = \overline{(\text{FRP}) \cdot (\text{EBL}) \cdot (\text{FRS}) \cdot (\text{LSB})}$$

where: FRP = Frame Pulse; FRS = Output of frame detector; EBL = Q output of enable flip-flop K–4; and LSB = Most left hand bit in inertia shift register which will be 0 if the circuit has been out of frame for eight or more frames. From the foregoing equation it will be seen that a $\overline{\text{JAM}}$ pulse will be generated when: the least significant bit LSB is low, and when the frame signal FRS is low and when the enable output EBL of the flip-flop F–*a* is high and when the frame pulse FRP occurs. The rising edge of the $\overline{\text{JAM}}$ signal, which corresponds to a falling edge of the T1 clock, is used to trigger the jamming pulse into the circuit of FIG. 8 via the $\overline{\text{JAM}}$ input to the one-shot multivibrator M–4 and gate G–1.

*See "Switching Theory And Logical Design" by Hill & Peterson, John Wiley & Sons, copyright 1968.

The generation of digit and channel times is simply a matter of counting down from the T1 line frequency. The format of a T1 channel and a T1 frame is shown in FIG. 4 at E. This diagram shows that it is digit time 1 (D1) that signifies the end of a channel. It also shows that D1 of channel 24 follows the framing bit. These two facts led to the development of the digit and channel counter chain shown at 14, 15 FIGS. 5*a*, 5*b* and in FIG. 12. The input to the three bit counter is normally the T1 clock. When the three bit counter (the digit counter) has completed its cycle and returned to the 000 state, the five bit counter (the channel counter) is incremented by one. The 000 state of the digit counter corresponds to D1 and the 00000 state of the channel counter corresponds to channel 24. The frame pulse resets both counters so the sequence is repeated for each frame. The NAND gate with inputs R1 and R2 acts to suppress the T1 clock when the frame pulse is to occur. The inputs R1 and R2 are taken from the most significant bits of the counter chain in the frame pulse generator shown in FIG. 8. The T1 clock is suppressed when the frame pulse occurs so that the digit counter will not count the frame pulse since it is not a digit time.

Each individual channel can now be decoded from the five bits of the channel counter, by the channel selecting circuit shown in the upper left of FIG. 15*b*. A list of all 24 channels with their corresponding codes are tabulated below.

CHANNEL CODES

| N5 | N4 | N3 | N2 | N1 | Channel | N5 | N4 | N3 | N2 | N1 | Channel |
|---|---|---|---|---|---|---|---|---|---|---|---|
| 0 | 0 | 0 | 0 | 0 | 24 | 0 | 1 | 0 | 1 | 1 | 6 |
| 0 | 0 | 0 | 0 | 1 | 1 | 0 | 1 | 1 | 0 | 0 | 18 |
| 0 | 0 | 0 | 1 | 0 | 13 | 0 | 1 | 1 | 0 | 1 | 7 |
| 0 | 0 | 0 | 1 | 1 | 2 | 0 | 1 | 1 | 1 | 0 | 19 |
| 0 | 0 | 1 | 0 | 0 | 14 | 0 | 1 | 1 | 1 | 1 | 8 |
| 0 | 0 | 1 | 0 | 1 | 3 | 1 | 0 | 0 | 0 | 0 | 20 |
| 0 | 0 | 1 | 1 | 0 | 15 | 1 | 0 | 0 | 0 | 1 | 9 |
| 0 | 0 | 1 | 1 | 1 | 4 | 1 | 0 | 0 | 1 | 0 | 21 |
| 0 | 1 | 0 | 0 | 0 | 16 | 1 | 0 | 0 | 1 | 1 | 10 |
| 0 | 1 | 0 | 0 | 1 | 5 | 1 | 0 | 1 | 0 | 0 | 22 |
| 0 | 1 | 0 | 1 | 0 | 17 | 1 | 0 | 1 | 0 | 1 | 11 |
| | | | | | | 1 | 0 | 1 | 1 | 0 | 23 |
| | | | | | | 1 | 0 | 1 | 1 | 1 | 12 |

Referring to FIG. 15*b*, the inputs to the NAND gate N–3 would be strapped through or around the inverters I in accordance with that of the desired channel.

A 56 kHz clock is needed for use in both the transmitter and receiver. This clock must be synchronous with the T1 line and must not eliminate the use of any channel for data transmission. The synchronous requirement eliminates the use of a master crystal oscillator and the channel usage requirement limits the positions in the T1 pulse stream where clock pulses may be generated.

A complete listing of all channels and their arrangements in the T1 frame is shown in FIG. 13*a*. Since the frame is repeated 8,000 times every second, it is obvious that we must generate seven equally spaced pulses to generate a 56 kHz clock. One possibility for generating a 56 kHz clock is to divide the 193 bits of a frame into seven equal parts. This would give 27.57 bits per interval. It is obvious that we cannot have 0.57 bits, therefore, we will have to have some combination of 27 and 28 bit intervals to give an average interval of 27.57 bits. Since neither 27 or 28 is an even multiple of the eight bits in each channel, we will have to generate a clock pulse in various digit times in different channels. This is not acceptable since if a clock pulse is generated in any position other than D1 in any channel, then the channel cannot be used for data transmission because of certain timing problems that would be encountered.

Since the clock pulses must be generated on D1 time slots, the actual intervals will be some multiple of the eight bits in each channel. The intervals will be a combination of 24 and 32 bit intervals to provide an average interval of 27.57 bits. The channels that have been used to generate the 56 kHz clock are shown in FIG. 13*a*. On D1 of each of the channels indicated by an arrow, a clock pulse is generated by the circuit shown at 16 of FIG. 5*b* and in FIG. 13*b*, via the channel pulse inputs to the OR gate 0–2 and the AND gate A–3, which latter is also supplied with the input digit D1 time and the T1 clock. It is evident that seven pulses of approximately equal spacing are generated for each frame and we now have a synchronous 56 kHz clock.

The output interface of the transmitter module, 33, FIG. 15*b*, described below, will store the synchronized data until the correct channel on the T1 line is present. At this time, the stored unipolar data will be transformed into bipolar data by the common equipment for transmission over the T1 line. In order to insure that the information will not affect any channel other than the one that has been assigned to this transmitter module, a disabling signal for the normal T1 signal must be developed in the common equipment that will prevent any interference between the normal T1 signal and the new data that is to be inserted. Such a disabling signal is as follows referring to 18, FIG. 5*b*.

$$\overline{DSL} = (\overline{CHN}) \cdot (\overline{INF}) \cdot (\overline{DI})$$

where: DSL = disable signal; CHN = indicates the desired channel time slot is present; INF = indicates the circuit is in frame with an inertia of eight frames; and DI = indicates the DI time slot has not arrived. This disabling signal is applied at DSL in the data insertion circuit 18 of FIG. 5*b*.

Once the correct data has been determined through the use of the disabling signal, it is necessary to transform this unipolar data into bipolar data with a 50 percent duty cycle relative to the T1 line clock period of 648 nsec. The problem of transforming unipolar data to bipolar data for transmission over the T1 carrier system is solved through the use of the circuit shown at 17 in FIG. 5*b* and in FIG. 14*a*. The J-K flip-flop F–*b* shown operates in the toggle mode and is clocked by the falling edge of a data pulse. The NAND gates A and C on the output can only be enabled one at a time. If gate A is enabled and a 1 data pulse occurs, the output of gate B will be forced high thus saturating the transistor Q1. With Q1 saturated a positive going pulse is produced at the output of the pulse transformer. The falling edge of the data pulse will cause the flip-flop to change state and thus enable gate C. When the next 1 data pulse occurs, a similar process will produce a negative pulse at the output of the pulse transformer and then enable gate D. The process will continue in this manner for all data pulses.

Figure 14B:
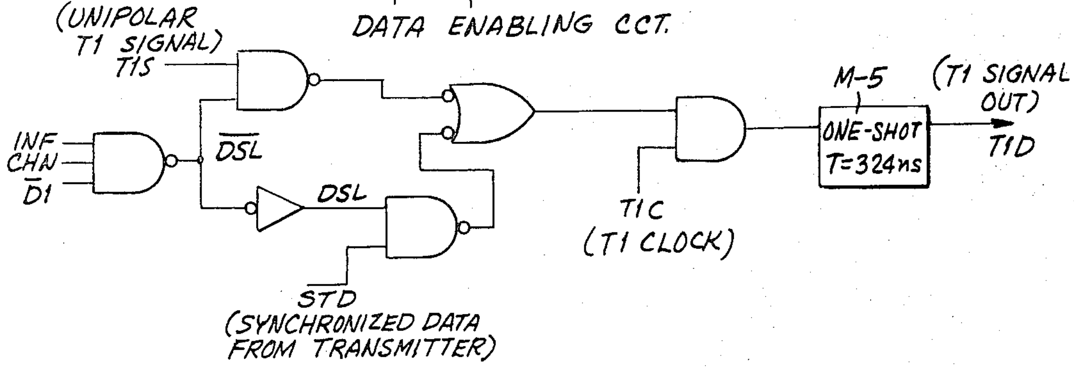

An enabling circuit shown at 18 in FIGS. 5*a* and 5*b* in FIG. 14*b*, is interfaced between the circuit components 10 and 17 of FIGS. 5*a* and 5*b* to assure that the correct data is transferred to bipolar form for transmission over the T1 line. In FIG. 14*b*, the one-shot multivibrator M–5 is set for a pulse width of 324 nsec. M–5 is triggered on the rising edge of the T1 clock if the data is a 1. This method of triggering assures that all data whether it is a normal T1 signal or data inserted by the output interface of the transmitter has the same phase relation to the T1 clock. The circuit discussed above is then used to transform the data to bipolar pulses for transmission.

The circuit for the transmitter module of the invention is shown in block diagram in FIG. 15*a* and in circuit diagram in FIG. 15*b*, wherein the circuits for components 30, 31, 32, etc. of FIG. 15*a* are shown within the like numbered dashed line areas of FIG. 15*b*.

The transmitter module is made up of two parts — the synchronizer and the output interface. The synchronizer performs all the functions necessary to synchronize the 50 kb/s data with the 56 kHz T1 channel clock. The output interface 33 serves as a buffer for the synchronizer data. The synchronizer can be broken down into three basic parts, the pulse stuffing command logic 30, the phase comparator 31, and the elastic store 32. The pulse stuffing command logic is shown more in detail in FIG. 16, and the elastic store and phase comparator more in detail in FIG. 17.

The pulse stuffing command logic performs all the necessary logic functions to allow synchronization of the 50 kb/s data. The elastic store provides storage for the input data for use by the pulse stuffing command logic. The phase comparator monitors the phase difference between the 50 kHz input clock of the elastic store and the read clock of the elastic store which is developed in the pulse stuffing command logic. If the phase difference falls below a specified level, a stuff request is sent to the pulse stuffing command logic.

The pulse stuffing command logic receives the request for a "stuff" frpm the phase comparator FIG. 17, and stores that information. The stuffing logic cannot do anything about the "stuff" request until the control bit times occur, following receipt of the channel framing bit of FIG. 3. At this time each of the control bits will be assigned a value as given by the expression:

$$CBD = (SRQ) \cdot (CBT)$$

where: CBD = value assigned to each control bit; SRQ = 1 if a "stuff" has been requested, 0 if no "stuff" was requested; and CBT = 1 only during those time slots available for control bits. Generation of a channel framing bit is accomplished referring to FIGS. **15*b* and 16, by a J-K flip-flop F-c, wired in the toggle mode. The time slot allocated to the frame bit is used to toggle the flip-flop. The equation for the frame bit referring to FIG. 16,** is:

$$FBD = (FFQ) . (FBT)$$

where: FBD = value of the frame bit which will alternate between 1 and 0; FFQ = Q output of the toggle flip flop; and FBT = time slot allocated for the frame bit.

The stuffing logic provides data for storage by the output interface 33, FIG. **15*b*, until the correct channel time occurs. This data is made up of six bits of information from the elastic store, 32, FIG. 15*b* and FIG. 17, plus one time shared pulse stuffing bit. The data from the elastic store, FIG. 17, as discussed below, should be enabled for six 56 kHz clock pulses (six data bits) and disabled for the seventh 56 kHz clock pulse since this would correspond to the time shared stuffing bit time. The data from the ealstic store must be enabled, however, during the dedicated data bit time and during the optional bit time if no stuff has been requested. Thus we cannot simply disable the elastic store data during the pulse stuffing time slot. The following equation describes a suitable enable signal for the elastic store data and the read clock of the elastic store referring to FIG. 16.**

$$ENL = PST + DBT + (OBT) \cdot (\overline{SRQ})$$

where: ENL = enable signal; PST = 1 if it is not the pulse stuffing time slot; DBT = dedicated data bit time slot; OBR = optional bit time slot; $\overline{SRQ}$ = 1 is no "stuff" has been requested. The pulse sutffing data bits have a value as given by:

$$PSD = CBD + FBD + (OBT) \cdot (SRQ)$$

where: PSD = value of pulse stuffing bits; CBD = control bit value FBD = frame bit value; OBT = optional bit time slot; and SRQ = 1 if a stuff has been requested. The data to be transmitted is a combination of the enabled elastic store data and the pulse stuffing data. The final combination is given by:

$$NTD = (ESD) . (ENL) + (PSD) . (PST)$$

where: NTD = data to be transmitted; ESD = elastic store data; ENL = enable signal as given on the previous page; PSD = pulse stuffing data as given on the previous page; PST = pulse stuffing time slot.

A logic circuit showing the implementation of all the foregoing equations is shown at 30, FIG. **15*b* and in FIG. 16 and is explained as follows. The three bit binary counter (PS1, PS2, PS3), is used to determine when the pulse stuffing time slot is going to occur. After the sixth 56 kHz clock pulse, the counter goes to the 110 state indicating the next pulse will be the seventh or the pulse stuffing time slot. The counter is reset after the seventh pulse. The second three bit counter (TS1, TS2, TS3**) is used to determine the different pulse stuffing bit times. The 000 condition indicates the pulse stuffing frame bit time, the 001 condition indicates the control bit 1 time slot and so forth. The following is a list of all the pulse stuffing bits and their codes:

| | |
|---|---|
| Frame Bit | 000 |
| Control Bit 1 | 001 |
| Control Bit 2 | 010 |
| Control Bit 3 | 011 |
| Optional Bit | 100 |
| Dedicated Data Bit | 101 |

These time slots may be decoded using three input gates as at G–5, FIG. 16, and then used in the pulse stuffing command logic. The counter is automatically reset after the dedicated data bit time.

Referring to FIG. 17, the elastic store is implemented as follows. The user's data is applied at USD to the data input of each of the flip-flops F1–F6. The clock inputs of the flip-flops are enabled in sequence through the decoding of the three bit read in counters I1–I3, driven by the user's clock USC which is a nominal 50 kHz. Each flip-flop F1–F6 receives data in sequence on the falling edge of the user's clock. The data is read out of the flip-flops using the 3-bit read out counter 01–03, driven by the enabled 56 kHz clock (the read clock) from the pulse stuffing logic. The outputs of the read out counter are used to drive a multiplexer MP which looks at each flip-flop F1–F6 in sequence and puts this data on a single line ESD. The data on the output line changes on the falling edge of the 56 kHz clock.

The phase comparator also shown in FIG. 17, comprises a one-shot multivibrator MV–6, an inverter I–6 and a NAND gate N–6 connected as shown. It is desirable to keep the elastic store operating about the point where the read out clock is half of the number of bits in the elastic store behind the read in clock. This means the read in clock should be on the fourth bit when the read out clock is on the first bit. If the read out clock gains on the read in clock, the elapsed time between the point when the read out clock reaches the last bit and the point when the read in clock reaches the last bit, will increase. The one-shot multivibrator MV–6 of the phase comparator is fired when the read in clock goes from the last bit to the first bit via $\overline{RS1}$ with an output pulse width of 60 us. If the read out clock goes from the last bit to the first bit via $\overline{RS2}$ before the 60 us pulse of the one-shot has fallen, then a pulse will be generated at $\overline{SRL}$ via the NAND gate N–6. This $\overline{SRL}$ pulse will tell the pulse stuffing command logic that a stuff is required.

The output interface shown at 33, FIG. **15*b* and in FIG. 18, is a seven bit shift register SR–1 that acts as a buffer. The data input NTD for the shift register is provided by the pulse stuffing circuit of FIG. 16, and is stable on the falling edge of the 56 kHz clock. This data is shifted into the register by the 56 kHz clock NDC and is shifted out for transmission over the T1 line by the T1 clock T1C. The clock input to the shift register is an OR'ing via gate G–10**, of these two clocks with the necessary enabling signals as discussed below to prevent any interference.

Since the 56 kHz clock is generated only on D1 time slots and the seven T1 clock pulses needed to clear the shift register all appear before D1, there is no interference between the two clocks provided the T1 clock is enabled by the same signal used to disable the normal T1 signal in the common equipment section. The enable signal referring to FIG. 18, is given by:

$DSL = (CHN) \cdot (INF) \cdot (\overline{D1})$ where:

DSL = enable signal; CHN = correct channel time slot; INF = in frame; and $\overline{D1}$ = not the D1 time slot. This signal insures that only seven pulses will be allowed through to clear the shift register when the correct channel time is present.

A block diagram of the complete receiver module is shown in block diagram FIG. 19*a* and in circuit diagram in 19*b*, wherein the components 40, 41, 42 etc. of FIG. 15a are shown within the like numbered dashed line enclosures of FIG. 19*b*. The receiver module is made up of two parts, the input interference and the desynchronizer. The input interface takes the data off that T1 channel which has been assigned to the receiver and which has been decoded by the channel selection option CS of FIG. 19*b*. It then buffers the information from the channel to allow the desynchronizer to process the data. The desynchronizer accepts the data from the input interface and decodes the pulse stuffing information. It then provides the data at the output, with the pulse stuffing bits removed, at a constant rate that is equal to the input rate at the transmitter.

The input interface shown at 41, in FIGS. 19*a* and *b*, and in FIG. 20, is very similar to the output interface used on the transmitter. Instead of putting data out onto the T1 line, however, data is removed from the T1 line and stored in a seven bit shift register SR–2. The enabling signal that allows data to be stored in the register is the same as that used to enable data to be put out on the line, i.e.:

$$DSL = CHN \cdot INF \cdot \overline{D1}$$

where the symbols are the same as those used in the FIG. 18 output interface. The clock line of the shift register is made up of an OR'ing of the T1 clock T1C enabled by DSL at the correct time and the 56 kHz clock NDC which supplies the data to the desynchronizer at DSD.

The desynchronizer is made up of three parts, the elastic store 42, the phase locked loop 43, and the pulse stuffing decoding logic 44, FIGS. 19*a* and *b*. The pulse stuffing decoding logic must decode the pulse stuffing bits and 'throw away' those bits that are not actual user data. It does this by disabling the write clock of the elastic store at the appropriate times. The elastic store and phase locked loop then work together to supply the data at a constant output rate.

In order to decode the pulse stuffing bits, the decoding logic must be in frame with the transmitter on a channel basis. This is the purpose of the framing bit in the pulse stuffing format. The circuit that performs this framing function is the channel framing detector shown at 45, FIG. 19*b* and in FIG. 21. This circuit is very similar to the circuit used to detect T1 framing as one would expect since the functions are identical. The frame pulse FRP FIG. 9, of the T1 framing circuit is replaced here by a pulse FBC, FIG. 21, generated during the channel framing time slot. The data used here is not the T1 line signal but the data DSD, FIG. 21, that has been taken off the T1 line and held in the shift register SR–2 of the input interface, FIG. 20. The 'in-frame' indicator DNF, FIG. 21, that is used for the rest of the desynchronizer has an inertia of only one bit. This allows for easy reframing on a channel basis.

Once the decoder, 44, FIG. 19*b*, is in frame with the pulse stuffing bits, it can then decode the rest of the pulse stuffing bit train. The decoder should disable the write clock of the elastic store if the framing bit time slot is present, if any of the control bit time slots are present, or during the optional bit time slot if a majority of the control bits were 1. The decoder should enable the write clock if it is not the pulse stuffing bit time, if a majority of the control bits were O, or if the dedicated bit time is present. An equation for the enabling function performed by the decoder is:

$$DNL = \overline{PST} + DBT + (MCZ) \cdot (OBT)$$

where: DNL = enable to write clock from decoder; $\overline{PST}$ = not the pulse stuffing time slot; DBT = dedicated data bit time slot; MCZ = 1 if a majority of the control bits were 0; and OBT = optional bit time slot.

A circuit to determine if a majority of the control bits have been 1 or 0 is shown at 44 in FIG. 19*b* and FIG. 22. The output 0–1 is:

$$0\text{–}1 = (DSD) \cdot (CBT) \cdot (PSC)$$

where: DSD = data output from input interface; CBT = only those time slots used by control bits; and PSC = clock pulse associated with the pulse stuffing time periods. The output 0–1 will consist of a pulse the same as PSC if the data is 1 and the control bit time slots are present. The falling edge of this output pulse will cause output 0–2 to change to the 1 state assuming it was in the 0 state since the flip-flop is wired in the toggle mode. Now if another 1 is present in the data stream during a control bit time, the R-S flip-flop made up from gates C and D will be set via AND gate A. The output 0–3 therefore will indicate that the majority of the control bits were 1 and the output 0–4 will indicate that the majority of control bits were 0. The output 0–4 therefore corresponds to the signal MCZ which will be high if the majority of the control bits is zero. This circuit is reset during the dedicated data bit time.

FIG. 23 shows the complete logic required for the pulse stuffing decoder and comprising the components shown within the dashed rectangles 44, 45 and 45*a* of FIG. 19*b*. The three bit counter (PS1, PS2, PS3) is used to generate a clock pulse every seventh pulse of the 56 kHz clock. This clock pulse is used as the pulse stuffing bit time clock as applied to the format of FIG. 3. The second three bit counter (TS1, TS2, TS3) is used to determine the different pulse stuffing time slots of FIG. 3. The 000 condition indicates the framing bit time slot, the 001 condition indicates the control bit 1 time slot, and so forth. A list of all the pulse stuffing time slots of FIG. 4 and their codes is as follows.

| | |
|---|---|
| Frame Bit | 000 |
| Control Bit 1 | 001 |
| Control Bit 2 | 010 |
| Control Bit 3 | 011 |
| Optional Bit | 100 |
| Dedicated Data Bit | 101 |

These times slots may be decoded using a three-input gate as at G–11, and then used in the pulse stuffing decoding logic. The counter is automatically reset after the dedicated data bit time.

The decoder has thus performed its function and has provided the elastic store with a clock that will write in only those bits of data that are user's data. The long term average of this write clock is the same as the long term average of the input clock at the transmitter. The short term write clock is made up of six pulses at 56 kHz with the seventh pulse sometimes present and sometimes not depending on the pulse stuffing. It is the job of the elastic store and the phase locked loop top provide the output data at a constant rate that is the long term average of the write clock.

The elastic store as shown at 42, FIGS. 19*a* and *b*, in FIG. 24, is the same as that used in the synchronizer. The data DSD is present on all the data inputs of the F1–F6 flip-flops, and each flip-flop takes data in a sequence determined by the three bit counter I1–I3 which is driven by the write clock WRC. This write clock only occurs when valid data is present because of the enable obtained from the decoder. The outputs of each flip-flop F1–F6 are inputs to a multiplexer MP which is driven by the read clock RDC of 50 kHz. This read clock is the output of the phase locked loop 43, FIGS. 19 and 24, which is the long term average of the write clock.

The phase locked loop needed for this system must be capable of 'smoothing out' the extreme phase shifts found in the write clock due to the removal of the pulse stuffing bits. The phase locked loop must be able to reduce this phase shift to a suitable level and in doing this it will provide an output that is the long term average of the write clock. Investigation has shown that a phase locked loop with a gain of 100 rad/sec/rad is required.

Reverting to FIG. 3, a format substantially in accordance therewith is applicable for transmitting a data stream of 40.8 kb/s over the T1 carried line at the 56 kb/s data rate. For accomplishing this the only modification of the FIG. 3 format would consist is employing five instead of six frames and using only five information bits per channel, in which case the sequence in digit frame 7 of FIG. 3 would comprise: the frame bit, a control bit one, a control bit two, a control bit three and an optional bit. Depending on whether the optional bit is employed for pulse stuffing or for an information bit the input data stream would range between 40.0 and 41.6 kb/s since one-fifth or eight bits = 1.6 kb/s.

As above pointed out multiples of the 50 kb/s rate may be transmitted at 56 kb/s over the T1 carrier by employment of two or more channels. Thus a data stream of 100 kb/s may be used transmitted by pre-empting two channels at a channel separation of 12, such as channels 2 and 14, and sequentially transmitting 50 kb/s at 56 kb/s over each. Similarly a 150 kb/s data stream may thus be transmitted by employing three channels at channel separations of eight channels each. The following tabulation embraces the various options available on this basis.

| Bit Rate kb/s | No. Channels Required | Channel Separations |
|---|---|---|
| 50 | 1 | 24 |
| 100 | 2 | 12 |
| 150 | 3 | 8 |
| 200 | 4 | 6 |
| 300 | 6 | 4 |
| 400 | 8 | 3 |
| 600 | 12 | 2 |
| 1200 | 24 | 0 |

These same principles are, of course, applicable to data transmission at multiples of the other bit rates above mentioned.

Or stated in general terms a data stream which is a multiple of the channel bit rate in a pulse code modulated, multiplexed carrier system, may be transmitted over the carrier facility at the channel bit rate by employing a number of channels equal to said multiple, and transmitting said data stream sequentially thereover at said channel bit rate.

Reverting to FIG. 1, the 56 kHz clock pulses generated in C–1 and C–2 may be connected over lines L–1 and L–2 to the data machines MT and MR respectively for clocking out data from machine MR and clocking in data to machine MR at said 56 kHz rate.

What is claimed is:

1. In a pulse code modulated communication system, the method of transmitting a data stream generated at the average rate of 50 kHz, over a transmission circuit at the long term rate of 56 kHz, and at the far end of said circuit recovering said 50 kHz data stream, which comprises the steps of: encoding said 50 kHz data stream in six successive frames of seven bits each, each frame comprising in sequence, six information bits and a time shared bit, encoding the time shared bit in the first frame as a framing bit, in the sixth frame as an information bit, in the fifth frame as an information bit if required for transmission of said data, and if so required, encoding the time shared bits in each of frames two, three and four with a "first digit" to so indicate, and if not so required, encoding said bits in each of the second, third and fourth frames with a "second digit" to indicate a requirement for a stuffed pulse in said fifth frame and encoding the time shared bit in the fifth frame with a non-data bearing stuffed bit.

2. The method according to claim 1, which includes the further steps of impressing said generated 50 kHz data stream on an elastic store and transmitting thence over said circuit at said 56 kHz rate while meantime inserting said non-data bearing stuffed bits in said impressed stream at a rate to maintain the output bit rate from said store at 56 kHz without depleting said store, at the opposite end of said circuit removing unconditionally all time-shared bits except that of frame five, and identifying and removing all stuffed bits from said data stream in response to identifying a majority of said frames two, three and four having a "first digit" in the time-shared bit position, impressing the resultant stream on an elastic store, and withdrawing said stream therefrom at said 50 kHz rate.

3. In a pulse code modulated communication system, the method of transmitting a data stream generated at the average rate of 50 kHz over a transmission circuit at the long term rate of 56 kHz and at the far end of said circuit recovering the 50 kHz data stream, which comprises the steps of: impressing said 50 kHz data stream on an elastic store and transmitting thence over said circuit at said 56 kHz rate, while meantime comparing the bit input rate to said store with the bit output rate therefrom, and inserting stuffed, non-data pulses into said data stream at a rate to maintain an output rate therefrom of 56 kHz without depleting said store and inserting a plurality of associated control bits for each inserted stuffed bit, at the opposite end of said circuit identifying and removing each of said stuffed pulses from said data stream in response to receiving a majority of said control bits associated therewith, impressing the resultant data stream on an elastic store, and withdrawing said stream therefrom at said 50 kHz rate without depleting said store.

4. In a pulse code modulated communication system, the method of transmitting a data stream generated at the average rate of 40.8 kHz, over a transmission circuit at the long term rate of 56 kHz, and at the far end of said circuit recovering said 40.8 kHz data stream, which comprises the steps of: encoding said 40.8 kHz data stream in five successive frames of seven bits each, each frame comprising in sequence, five information bits and a time shared bit, encoding the time shared bit in the first frame as a framing bit, in the fifth frame as an information bit if required for transmission of said data, and if so required, encoding the time shared bits in each of frames two, three and four with a "first digit" to so indicate, and if not so required, encoding said bits in each of the second, third and fourth frames with a "second digit" to indicate a requirement for a stuffed bit in said fifth frame and encoding the time-shared bit in the fifth frame with a non-data bearing stuffed bit.

5. The method according to claim 4, which includes the further steps of impressing said generated 40.8 kHz data stream on an elastic store and transmitting thence over said circuit at said 56 kHz rate while meantime inserting said non-data bearing stuffed bits in said impressed stream at a rate to maintain the output bit rate from said store at 56 kHz without depleting said store, at the opposite end of said circuit identifying and removing each stuffed bit from said data stream in response to a majority of "first digits" in the associated frames two, three and four, impressing the resultant stream on an elastic store, and withdrawing said stream therefrom at said 40.8 kHz rate.

6. In a pulse code modulated communication system, the method of transmitting a data stream generated at the average rate of 40.8 kHz over a transmission circuit at the long term rate of 56 kHz and at the far end of said circuit recovering the 40.8 kHz data stream, which comprises the steps of: impressing said 40.8 kHz data stream on an elastic store and transmitting thence over said circuit at said 56 kHz rate, while meantime comparing the bit input rate to said store with the bit output rate therefrom, and inserting stuffed, non-data pulses into said data stream at a rate to maintain an output rate therefrom of 56 kHz without depleting said store and inserting in defined time slots a plurality of associated control bits for each inserted stuffed bit, at the opposite end of said circuit identifying and removing each of said stuffed pulses from said data stream in response to a majority of said plurality of associated control bits, impressing the resultant data stream on an elastic store, and withdrawing said stream therefrom at said 40.8 kHz rate without depleting said store.

7. A pulse code modulated communication system for transmitting a data stream generated at the average rate 50 kHz over a transmission circuit at the long term rate of 56 kHz, and at the far ends of said circuit recovering said 50 kHz data stream, comprising:

means for encoding said 50 kHz data stream in six successive frames of seven bits each, each frame comprising in sequence, six information bits and a time-shared bit;

means for encoding the time-shared bit in the first frame as a framing bit, in the sixth frame as an information bit, in the fifth frame as an information bit if required for transmission of said data at the selected long term rate and if so required, encoding the time-shared bits of each of frames two, three and four with a first digit to so indicate, and if not so required, encoding said bits in each of frames two, three and four with a second digit to indicate a requirement for a stuffed bit in said fifth frame and encoding the time-shared bit in the fifth frame with a nondata bearing stuffed bit.

8. A system as in claim 7 including an elastic store and means for impressing said generated 50 kHz data stream on the elastic store, means for transmitting therefrom over said circuit at said 56 kHz rate while meantime inserting said non-data bearing stuffed bits in said impressed stream at a rate to maintain the output bit rate from the elastic store at 56 kHz without depleting the store, means at the opposite end of said circuit for removing unconditionally all time-shared bits except that of frame five, and means for identifying and removing all stuffed bits from said data stream in response to identifying a majority of said frames two, three and four having a first digit in the time-shared bit position, means for impressing the resultant stream on a second elastic store, and means for withdrawing the stream therefrom at said 50 kHz rate.

9. A pulse code modulated communication system for transmitting a data stream generated at the average rate of 50 kHz over a transmission circuit at the long term rate of 56 kHz and at the far end of said circuit recovering the 50 kHz data stream, comprising: an elastic store and means for impressing said 50 kHz data stream on the elastic store, means for transmitting from said elastic store over said circuit at said 56 kHz rate while meantime comparing the bit input rate to said store with the bit output rate therefrom, means for inserting stuffed non-data pulses into said data stream at a rate to maintain an output rate therefrom at 56 kHz without depleting said store and for inserting a plurality of associated control bits for each inserted stuffed bit in the data stream, means at the opposite end of said circuit for identifying and removing each of said stuffed pulses from said data stream in response to receiving a majority of said control bits associated therefrom, a second elastic store and means for impressing the resultant data stream on said second elastic store, and means for withdrawing said stream from the second elastic store at said 50 kHz rate without depleting said second elastic store.

10. A pulse code modulated communication system for transmitting a data stream generated at the rate of 40.8 kHz over a transmission circuit at the rate of 56 kHz, and in the far end of said circuit recovering said 40.8 kHz data stream, comprising: means for encoding said 40.8 kHz data stream in five successive frames of seven bits each, each frame comprising in sequence, five information bits and a time-shared bit, means for encoding the time-shared bit in the first frame as a framing bit, in the fifth frame as an information bit if required for transmitting said data stream at the higher rate, and if so required, for encoding the time-shared bits in each of frames two, three and four with a first digit to so indicate, and if not so required, for encoding said bits in each of the second, third and fourth frames with a second digit to indicate a requirement for a non-data bearing stuffed bit in said fifth frame and for encoding the timeshared bit in the fifth frame with a non-data bearing stuffed bit.

11. A system as in claim 10 including a first elastic store and means for impressing said generated 40.8 kHz data stream on the first elastic store, means for transmitting therefrom over said circuit at said 56 kHz rate while meantime inserting said non-data bearing stuffed bits in said impressed stream at a rate to maintain the output bit rate from said first elastic store at 56 kHz without depleting said store, means at the opposite end of said circuit identifying and removing each stuffed bit from said data stream in response to a majority of first digits in the associated frames two, three and four, a second elastic store, means for impressing the resultant stream on said second elastic store, and means for withdrawing said stream from the second store at said 40.8 kHz rate.

12. A pulse code modulated communication system for transmitting a data stream generated at the average rate of 40.8 kHz over a transmission circuit at the long term rate of 56 kHz and at the far end of said circuit recovering the 40.8 kHz data stream, comprising: a first elastic store and means for impressing said 40.8 kHz data stream on the first elastic store and for transmitting thence over said circuit at said 56 kHz rate while meantime comparing the bit input rate to said store with the bit output rate therefrom, means for inserting stuffed, non-data pulses into said data stream at a rate to maintain an output rate therefrom of 56 kHz without depleting the first elastic store and inserting in defined time slots of the bit stream a plurality of associated control bits for each inserted stuffed bit, means at the opposite end of said circuit for identifying and removing each of said stuffed pulses from said data stream in response to a majority of said plurality of said associated control bits, a second elastic store, means for impressing the resultant data stream on the second elastic store, and means for withdrawing said stream from the second elastic store at said 40.8 kHz rate without depleting said store.

13. Apparatus for transmitting at a given long term rate successive frames of binary data by multiple channel time division multiplexing where each frame includes a multibit byte for each channel in selected time slots of the frame, said apparatus including a transmitting device for accepting a data bit stream at an average rate lower than the long term rate for a channel and for transmitting said data bit stream at the long term channel rate over a selected channel, said transmitting device comprising:

means for receiving the data bit stream and for arranging the bits thereof into like groups each of less bits than a byte;

means for forming successive multibyte blocks, each successive byte of a block including a successive one of said groups of data bits from the data bit stream and having a selected bit position unoccupied by a bit from said groups, the unoccupied bit position of at least one selected block byte being defined as an optional bit position;

means for generating block framing bits and for placing a block framing bit in the selected bit position of at least one of the block bytes;

means for detecting the difference between the number of accepted and the number of transmitted data bits from the data bit;

means for placing a stuffed bit in each optional bit position of the block if the difference is in a first range but for placing a successive data bit from the data bit stream in each optional bit position if the difference is in a second range;

means for placing a first type control bit in the selected bit positions of a plurality of block bytes if a stuffed bit has been placed in the block but for placing a second type control bit in the last recited bit positions if no stuffed bit has been placed in the blocks; and means for transmitting the block over the selected channel, each transmitted block byte including a group of data bits from the received stream and a bit in the selected bit position.

14. Apparatus as in claim 13 including a device for receiving the transmitted blocks over said channel, said receiving device having decoding means for arranging the data bit groups of each block in a continuous data bit stream, means responsive to the majority of the control bits of a block being of said first type to prevent inserting the bit in each optional bit position of the block in the continuous stream but responsive to the majority of the control bits being of the second type to insert the bit in each optional bit position in the continuous data bit stream.

15. Apparatus as in claim 14 wherein the forming means of the transmitting device includes means for placing a successive data bit from the data bit stream in the selected bit position of at least one byte of each of said blocks, each of the last recited selected bit position being defined as a dedicated bit position, and wherein the decoding means of the receiving device includes means for inserting the bit from each dedicated bit position of each block into the continuous data bit stream.

16. Apparatus as in claim 15 wherein there are 24 channels each having an eight-bit byte per frame, and wherein each block comprises at least six bytes, each transmitted byte including at least six but no more than seven bits from the data bit stream.

17. Apparatus as in claim 16 wherein the block framing bit is placed in the first block byte, the dedicated bit position is in the last block byte and the optional bit position is in the next-to-the-last block byte.

18. Apparatus as in claim 13 wherein the forming means of the transmitting device includes means for placing a successive data bit from the data bit stream in the selected bit position of at least one byte of each of said blocks, each of the last recited selected bit position being defined as a dedicated bit position.

19. Apparatus as in claim 18 wherein each of the block bytes formed by the forming means includes a group of six data bits from the data bit stream, one of the bytes additionally includes a seventh data bit from the data bit stream, and another of the bytes additionally includes either a stuffed bit or a data bit from the data bit stream as determined by the means for placing a stuffed bit, whereby a data bit stream having an average rate of 50 kHz may be transmitted over a channel having a long term rate of at least 56 kHz.

20. A method of transmitting at a given long term rate successive frames of binary data by multiple channel time division multiplexing where each frame includes a multibit byte for each channel in selected time slots of the frame, said method including accepting a data bit stream at an average rate lower than the long term rate for a channel and transmitting said data bit stream at the long term channel rate over a selected channel, comprising the steps of:

receiving the data bit stream and arranging the bits thereof into like groups each of less bits than a byte;

forming successive multibyte blocks, each successive byte of a block including a successive one of said groups of data bits and having a selected bit position unoccupied by a bit from said groups, the unoccupied bit position of at least one selected block byte being defined as an optional bit position;

generating block framing bits and placing a block framing bit in the selected bit position of a first block byte;

detecting the difference between the number of received and the number of transmitted data bits from the data bit stream;

placing a stuffed bit in each optional bit position of the block if the difference is in a first range but placing a successive data bit from the data bit stream in each optional bit position if the difference is in a second range;

placing a first type control bit in the selected bit positions of a plurality of block bytes if a stuffed bit has been placed in the block but placing a second type control bit in the last recited bit positions if no stuffed bit has been placed in the block; and transmitting the block over the selected channel, each transmitted block byte including a group of data bits from the received stream and a bit in the selected bit position.

21. A method as in claim 20 including the steps of receiving the transmitted blocks over said channel, arranging the data bit groups of each block in a continuous data bit stream, while deleting the control bits and the block framing bits, deleting the bit in the optional bit position in response to the majority of the control bits of a block being of said first type but adding the bit in the optional bit position in response to the majority of the control bits being of the second type.

22. A method as in claim 21 including the steps of placing a successive data bit from the data bit stream in the selected bit position of at least one byte of each of said blocks, each of the last recited selected bit position being defined as a dedicated bit position, and inserting the bit from each dedicated bit position of each block into the continuous data bit stream.

23. A method as in claim 22 wherein there are twenty-four channels each having an eight-bit byte per frame, and wherein each block comprises at least six bytes, each having at least six but no more than seven data bits from said data bit stream.

24. A method as in claim 23 wherein the block framing bit is placed in the first block byte, the dedicated bit position is in the last block byte and the optional bit position is in the next-to-the-last block byte.

* * * * *